(12) United States Patent
Pradhan et al.

(10) Patent No.: US 9,030,725 B2
(45) Date of Patent: May 12, 2015

(54) DRIVING THIN FILM SWITCHABLE OPTICAL DEVICES

(71) Applicant: View, Inc., Milpitas, CA (US)

(72) Inventors: Anshu Pradhan, Fremont, CA (US); Disha Mehtani, Mountain View, CA (US); Gordon Jack, Santa Clara, CA (US)

(73) Assignee: View, Inc., Milpitas, CA (US)

( * ) Notice: Subject to any disclaimer, the term of this patent is extended or adjusted under 35 U.S.C. 154(b) by 168 days.

(21) Appl. No.: 13/682,618

(22) Filed: Nov. 20, 2012

(65) Prior Publication Data

US 2013/0271815 A1 Oct. 17, 2013

Related U.S. Application Data

(63) Continuation-in-part of application No. 13/452,032, filed on Apr. 20, 2012, and a continuation-in-part of application No. 13/449,248, filed on Apr. 17, 2012.

(60) Provisional application No. 61/680,221, filed on Aug. 6, 2012.

(51) Int. Cl.
*G02F 1/153* (2006.01)
*G02F 1/15* (2006.01)
(Continued)

(52) U.S. Cl.
CPC *G02F 1/15* (2013.01); *G02F 1/155* (2013.01); *G02F 1/163* (2013.01)

(58) Field of Classification Search
USPC .......................................... 359/275
See application file for complete search history.

(56) References Cited

U.S. PATENT DOCUMENTS

| 5,124,833 A | 6/1992 | Barton et al. |
| 5,170,108 A | 12/1992 | Peterson et al. |

(Continued)

FOREIGN PATENT DOCUMENTS

| CN | 101969207 A | 2/2011 |
| EP | 0445314 | 9/1991 |

(Continued)

OTHER PUBLICATIONS

U.S. Appl. No. 13/449,235, filed Apr. 17, 2012.
(Continued)

*Primary Examiner* — James Jones
(74) *Attorney, Agent, or Firm* — Weaver Austin Villeneuve & Sampson LLP; Brian D. Griedel

(57) ABSTRACT

Controllers and control methods apply a drive voltage to bus bars of a thin film optically switchable device. The applied drive voltage is provided at a level that drives a transition over the entire surface of the optically switchable device but does not damage or degrade the device. This applied voltage produces an effective voltage at all locations on the face of the device that is within a bracketed range. The upper bound of this range is associated with a voltage safely below the level at which the device may experience damage or degradation impacting its performance in the short term or the long term. At the lower boundary of this range is an effective voltage at which the transition between optical states of the device occurs relatively rapidly. The level of voltage applied between the bus bars is significantly greater than the maximum value of the effective voltage within the bracketed range.

25 Claims, 11 Drawing Sheets

(51) Int. Cl.
  *G02F 1/155*    (2006.01)
  *G02F 1/163*    (2006.01)

(56) References Cited

U.S. PATENT DOCUMENTS

| | | |
|---|---|---|
| 5,204,778 A | 4/1993 | Bechtel |
| 5,220,317 A | 6/1993 | Lynam et al. |
| 5,290,986 A | 3/1994 | Colon et al. |
| 5,353,148 A | 10/1994 | Eid et al. |
| 5,365,365 A | 11/1994 | Ripoche et al. |
| 5,379,146 A | 1/1995 | Defendini |
| 5,384,578 A | 1/1995 | Lynam et al. |
| 5,402,144 A | 3/1995 | Ripoche |
| 5,451,822 A | 9/1995 | Bechtel et al. |
| 5,598,000 A | 1/1997 | Popat |
| 5,621,526 A | 4/1997 | Kuze |
| 5,673,028 A | 9/1997 | Levy |
| 5,694,144 A | 12/1997 | Lefrou et al. |
| 5,764,402 A | 6/1998 | Thomas et al. |
| 5,822,107 A | 10/1998 | Lefrou et al. |
| 5,900,720 A | 5/1999 | Kallman et al. |
| 5,956,012 A | 9/1999 | Turnbull et al. |
| 5,973,818 A | 10/1999 | Sjursen et al. |
| 5,973,819 A | 10/1999 | Pletcher et al. |
| 5,978,126 A | 11/1999 | Sjursen et al. |
| 6,039,850 A | 3/2000 | Schulz et al. |
| 6,055,089 A | 4/2000 | Schulz et al. |
| 6,084,700 A | 7/2000 | Knapp et al. |
| 6,130,448 A | 10/2000 | Bauer et al. |
| 6,130,772 A | 10/2000 | Cava |
| 6,222,177 B1 | 4/2001 | Bechtel et al. |
| 6,262,831 B1 | 7/2001 | Bauer et al. |
| 6,386,713 B1 | 5/2002 | Turnbull et al. |
| 6,407,468 B1 | 6/2002 | LeVesque et al. |
| 6,449,082 B1 | 9/2002 | Agrawal et al. |
| 6,471,360 B2 | 10/2002 | Rukavina et al. |
| 6,535,126 B2 | 3/2003 | Lin et al. |
| 6,567,708 B1 | 5/2003 | Bechtel et al. |
| 6,614,577 B1 | 9/2003 | Yu et al. |
| 6,795,226 B2 | 9/2004 | Agrawal et al. |
| 6,829,511 B2 | 12/2004 | Bechtel et al. |
| 6,856,444 B2 | 2/2005 | Ingalls et al. |
| 6,897,936 B1 | 5/2005 | Li et al. |
| 6,940,627 B2 | 9/2005 | Freeman et al. |
| 7,085,609 B2 | 8/2006 | Bechtel et al. |
| 7,133,181 B2 | 11/2006 | Greer |
| 7,215,318 B2 | 5/2007 | Turnbull et al. |
| 7,277,215 B2 | 10/2007 | Greer |
| 7,304,787 B2 | 12/2007 | Whitesides et al. |
| 7,417,397 B2 | 8/2008 | Berman et al. |
| 7,542,809 B2 | 6/2009 | Bechtel et al. |
| 7,548,833 B2 | 6/2009 | Ahmed |
| 7,567,183 B2 | 7/2009 | Schwenke |
| 7,610,910 B2 | 11/2009 | Ahmed |
| 7,817,326 B1 | 10/2010 | Rennig et al. |
| 7,822,490 B2 | 10/2010 | Bechtel et al. |
| 7,873,490 B2 | 1/2011 | MacDonald |
| 7,941,245 B1 | 5/2011 | Popat |
| 7,972,021 B2 | 7/2011 | Scherer |
| 7,990,603 B2 | 8/2011 | Ash et al. |
| 8,004,739 B2 | 8/2011 | Letocart |
| 8,018,644 B2 | 9/2011 | Gustavsson et al. |
| 8,102,586 B2 | 1/2012 | Albahri |
| 8,213,074 B1 | 7/2012 | Shrivastava et al. |
| 8,254,013 B2 | 8/2012 | Mehtani et al. |
| 8,292,228 B2 | 10/2012 | Mitchell et al. |
| 8,456,729 B2 | 6/2013 | Brown et al. |
| 8,547,624 B2 | 10/2013 | Ash et al. |
| 8,705,162 B2 | 4/2014 | Brown et al. |
| 8,864,321 B2 | 10/2014 | Mehtani et al. |
| 2002/0075472 A1 | 6/2002 | Holton |
| 2002/0152298 A1 | 10/2002 | Kikta et al. |
| 2003/0210449 A1 | 11/2003 | Ingalls et al. |
| 2003/0210450 A1 | 11/2003 | Yu et al. |
| 2003/0227663 A1 | 12/2003 | Agrawal et al. |
| 2003/0227664 A1 | 12/2003 | Agrawal et al. |
| 2004/0001056 A1 | 1/2004 | Atherton et al. |
| 2004/0135989 A1 | 7/2004 | Klebe |
| 2004/0160322 A1 | 8/2004 | Stilp |
| 2005/0200934 A1 | 9/2005 | Callahan et al. |
| 2005/0225830 A1 | 10/2005 | Huang et al. |
| 2005/0268629 A1 | 12/2005 | Ahmed |
| 2005/0270620 A1 | 12/2005 | Bauer et al. |
| 2005/0278047 A1 | 12/2005 | Ahmed |
| 2006/0018000 A1 | 1/2006 | Greer |
| 2006/0170376 A1 | 8/2006 | Piepgras et al. |
| 2006/0187608 A1 | 8/2006 | Stark |
| 2006/0209007 A1 | 9/2006 | Pyo et al. |
| 2006/0245024 A1 | 11/2006 | Greer |
| 2007/0002007 A1 | 1/2007 | Tam |
| 2007/0067048 A1 | 3/2007 | Bechtel et al. |
| 2007/0162233 A1 | 7/2007 | Schwenke |
| 2007/0285759 A1 | 12/2007 | Ash et al. |
| 2008/0018979 A1 | 1/2008 | Mahe et al. |
| 2009/0027759 A1 | 1/2009 | Albahri |
| 2009/0066157 A1 | 3/2009 | Tarng et al. |
| 2009/0143141 A1 | 6/2009 | Wells et al. |
| 2009/0243732 A1 | 10/2009 | Tarng et al. |
| 2009/0243802 A1 | 10/2009 | Wolf et al. |
| 2010/0039410 A1 | 2/2010 | Becker et al. |
| 2010/0066484 A1 | 3/2010 | Hanwright et al. |
| 2010/0082081 A1 | 4/2010 | Niessen et al. |
| 2010/0172009 A1 | 7/2010 | Matthews |
| 2010/0172010 A1 | 7/2010 | Gustavsson et al. |
| 2010/0188057 A1 | 7/2010 | Tarng |
| 2010/0235206 A1 | 9/2010 | Miller et al. |
| 2010/0243427 A1 | 9/2010 | Kozlowski et al. |
| 2010/0245972 A1 | 9/2010 | Wright |
| 2010/0315693 A1 | 12/2010 | Lam et al. |
| 2011/0046810 A1 | 2/2011 | Bechtel et al. |
| 2011/0063708 A1 | 3/2011 | Letocart |
| 2011/0148218 A1 | 6/2011 | Rozbicki |
| 2011/0164304 A1 | 7/2011 | Brown et al. |
| 2011/0167617 A1 | 7/2011 | Letocart |
| 2011/0235152 A1 | 9/2011 | Letocart |
| 2011/0249313 A1 | 10/2011 | Letocart |
| 2011/0255142 A1 | 10/2011 | Ash et al. |
| 2011/0266419 A1 | 11/2011 | Jones et al. |
| 2011/0292488 A1 | 12/2011 | McCarthy et al. |
| 2011/0304898 A1 | 12/2011 | Letocart |
| 2012/0026573 A1 | 2/2012 | Collins et al. |
| 2012/0062975 A1* | 3/2012 | Mehtani et al. ............ 359/265 |
| 2012/0190836 A1 | 7/2012 | Anderson |
| 2012/0194895 A1 | 8/2012 | Podbelski et al. |
| 2012/0200908 A1 | 8/2012 | Bergh et al. |
| 2012/0236386 A1 | 9/2012 | Mehtani et al. |
| 2012/0239209 A1 | 9/2012 | Brown et al. |
| 2012/0268803 A1 | 10/2012 | Greer |
| 2012/0293855 A1 | 11/2012 | Shrivastava et al. |
| 2013/0158790 A1 | 6/2013 | McIntyre, Jr. et al. |
| 2013/0242370 A1 | 9/2013 | Wang |
| 2013/0271812 A1 | 10/2013 | Brown et al. |
| 2013/0271813 A1 | 10/2013 | Brown |
| 2013/0271814 A1 | 10/2013 | Brown |
| 2014/0067733 A1 | 3/2014 | Humann |
| 2014/0160550 A1 | 6/2014 | Brown et al. |
| 2014/0236323 A1 | 8/2014 | Brown et al. |
| 2014/0259931 A1 | 9/2014 | Plummer |
| 2014/0268287 A1 | 9/2014 | Brown et al. |
| 2014/0300945 A1 | 10/2014 | Parker |
| 2014/0330538 A1 | 11/2014 | Conklin et al. |
| 2014/0371931 A1 | 12/2014 | Lin et al. |
| 2015/0002919 A1 | 1/2015 | Jack et al. |

FOREIGN PATENT DOCUMENTS

| | | |
|---|---|---|
| EP | 0869032 A2 | 10/1998 |
| EP | 0835475 B1 | 9/2004 |
| EP | 1510854 A1 | 3/2005 |
| EP | 1417535 B1 | 11/2005 |
| EP | 1619546 A2 | 1/2006 |
| EP | 0920210 | 6/2009 |
| EP | 2161615 A1 | 3/2010 |
| EP | 2357544 A2 | 8/2011 |

(56) References Cited

FOREIGN PATENT DOCUMENTS

| | | |
|---|---|---|
| JP | 63-208830 | 8/1988 |
| JP | 02-132420 | 5/1990 |
| JP | 05-178645 | 7/1993 |
| JP | 10-063216 | 3/1998 |
| JP | 2004-245985 | 9/2004 |
| JP | 4799113 B2 | 10/2011 |
| JP | 2013-057975 A | 3/2013 |
| KR | 20-0412640 | 3/2006 |
| KR | 10-752041 B1 | 8/2007 |
| KR | 10-2008-0022319 | 3/2008 |
| KR | 10-2009-0026181 | 3/2009 |
| KR | 10-0904847 B1 | 6/2009 |
| KR | 10-0931183 | 12/2009 |
| KR | 10-2010-0034361 | 4/2010 |
| KR | 10-2011-0003698 | 1/2011 |
| KR | 10-2011-0094672 | 8/2011 |
| WO | WO 98/16870 | 4/1998 |
| WO | WO 02/13052 | 2/2002 |
| WO | WO 2004/003649 | 1/2004 |
| WO | WO 2005/098811 | 10/2005 |
| WO | WO 2005/103807 | 11/2005 |
| WO | WO 2007/016546 A2 | 2/2007 |
| WO | WO 2007/146862 | 12/2007 |
| WO | WO 2008/030018 | 3/2008 |
| WO | WO 2008/147322 | 12/2008 |
| WO | WO 2009/124647 | 10/2009 |
| WO | WO 2010/120771 | 10/2010 |
| WO | WO 2011/020478 | 2/2011 |
| WO | WO 2011/087684 | 7/2011 |
| WO | WO 2011/087687 | 7/2011 |
| WO | WO 2011/124720 | 10/2011 |
| WO | WO 2011/127015 | 10/2011 |
| WO | WO 2012/080618 | 6/2012 |
| WO | WO 2012/080656 | 6/2012 |
| WO | WO 2012/080657 | 6/2012 |
| WO | WO 2012/145155 | 10/2012 |
| WO | WO 2013/059674 | 4/2013 |
| WO | WO 2013/109881 | 7/2013 |
| WO | WO 2013/155467 | 10/2013 |
| WO | WO 2014/121863 | 8/2014 |
| WO | WO 2014/134451 | 9/2014 |

OTHER PUBLICATIONS

U.S. Appl. No. 13/449,248, filed Apr. 17, 2012.
U.S. Appl. No. 13/449,251, filed Apr. 17, 2012.
U.S. Appl. No. 13/479,137, filed May 23, 2012.
US Office Action dated Feb. 3, 2012 in U.S. Appl. No. 13/049,750.
US Office Action dated Mar. 27, 2012 in U.S. Appl. No. 13/049,623.
US Final Office Action dated Apr. 30, 2012 U.S. Appl. No. 13/049,750.
US Notice of Allowance dated May 8, 2012 in U.S. Appl. No. 13/049,750.
US Notice of Allowance dated Jul. 20, 2012 in U.S. Appl. No. 13/049,623.
International Search Report and Written Opinion dated Sep. 24, 2012, issued in PCT/US2012/027909.
Inernational Search Report and Written Opinion dated Sep. 24, 2012, issued in PCT/US2012/027742.
International Search Report and Written Opinion dated Sep. 26, 2012, issued in PCT/US2012/027828.
U.S. Appl. No. 14/468,778, filed Aug. 26, 2014.
U.S. Appl. No. 13/931,459, filed Jun. 28, 2013.
U.S. Office Action dated Jan. 18, 2013 in U.S. Appl. No. 13/049,756.
U.S. Final Office Action dated Aug. 19, 2013 in U.S. Appl. No. 13/049,756.
U.S. Office Action dated Oct. 6, 2014 in U.S. Appl. No. 13/049,756.
U.S. Office Action dated Oct. 6, 2014 in U.S. Appl. No. 13/968,258.
US Office Action dated Sep. 23, 2013 in U.S. Appl. No. 13/479,137.
US Final Office Action dated Jan. 27, 2014 in U.S. Appl. No. 13/479,137.
US Office Action dated Jul. 3, 2014 in U.S. Appl. No. 13/479,137.
US Office Action dated Dec. 24, 2013 in U.S. Appl. No. 13/309,990.
Notice of Allowanced dated Jun. 17, 2014 in U.S. Appl. No. 13/309,990.
US Office Action dated Oct. 11, 2013 in U.S. Appl. No. 13/449,235.
US Notice of Allowance dated Jan. 10, 2014 in U.S. Appl. No. 13/449,235.
US Office Action dated Nov. 29, 2013 in U.S. Appl. No. 13/449,248.
US Office Action dated Nov. 29, 2013 in U.S. Appl. No. 13/449,251.
US Final Office Action dated May 16, 2014 in U.S. Appl. No. 13/449,248.
US Office Action dated Sep. 29, 2014 in U.S. Appl. No. 13/449,248.
US Final Office Action dated May 15, 2014 in U.S. Appl. No. 13/449,251.
US Office Action dated Oct. 28, 2014 in U.S. Appl. No. 13/449,251.
International Preliminary Report on Patentability dated Sep. 26, 2013, issued in PCT/US2012/027828.
International Preliminary Report on Patentability dated Sep. 26, 2013, issued in PCT/US2012/027909.
International Preliminary Report on Patentability dated Sep. 26, 2013, issued in PCT/US2012/027742.
International Search Report and Written Opinion dated Mar. 28, 2013 in PCT/US2012/061137.
International Preliminary Report on Patentability dated May 1, 2014 in PCT/US2012/061137.
International Search Report and Written Opinion dated Jul. 23, 2013, issued in PCT/US2013/036235.
International Preliminary Report on Patentability dated Oct. 30, 2014 issued in PCT/US2013/036235.
International Search Report and Written Opinion dated Jul. 26, 2013, issued in PCT/US2013/036456.
International Preliminary Report on Patentability dated Oct. 23, 2014 issued in PCT/US2013/036456.
International Search Report and Written Opinion dated Jul. 11, 2013, issued in PCT/US2013/034998.
International Preliminary Report on Patentability dated Oct. 30, 2014 issued in PCT/US2013/034998.
International Search Report and Written Opinion dated Dec. 26, 2013, issued in PCT/US2013/053625.
International Search Report and Written Opinion dated May 26, 2014, issued in PCT/US2014/016974.
International Search Report and Written Opinion dated Oct. 16, 2014, issued in PCT/US2014/043514.
European Search Report dated Jul. 29, 2014 in European Application No. 12758250.0.
European Search Report dated Jul. 23, 2014 in European Application No. 12756917.6.
European Search Report dated Aug. 11, 2014 in European Application No. 12757877.1.
Lim, Sunnie H.N. et al., "Modeling of optical and energy performance of tungsten-oxide-based electrochromic windows including their intermediate states," Solar Energy Materials & Solar Cells, vol. 108, Oct. 16, 2012, pp. 129-135.
"SageGlass helps Solar Decathlon—and AIA award-winning home achieve net-zero energy efficiency" in MarketWatch.com, Jun. 7, 2012. [http://www.marketwatch.com/story/sageglass-helps-solar-decathlon-and-aia-award-winning-home-achieve-net-zero-energy-efficiency-2012-06-07].
"New from Pella: Windows with Smartphone-run blinds", Pella Corp., Jan. 13, 2012 [http://www.desmoinesregister.com/article/20120114/BUSINESS/301140031/0/biggame/?odyssey=nav%7Chead].
"How Cleantech wants to make a 2012 comeback" Jan. 23, 2012. [http://mountainview.patch.com/articles/how-cleantech-wants-to-make-a-2012-comeback].
APC by Schneider Electric, Smart-UPS 120V Product Brochure, 2013, 8 pp.
Hoosier Energy, "How do they do that? Measuring Real-Time Cloud Activity" Hoosier Energy Current Connections, undated. [http://members.questline.com/Article.aspx?articleID=18550&accountID=196000&n1=11774].

(56) References Cited

OTHER PUBLICATIONS

Kleissl, Jan et al., "Recent Advances in Solar Variability Modeling and Solar Forecasting at UC San Diego," Proceedings, American Solar Energy Society, 2013 Solar Conference, Apr. 16-20, 2013, Baltimore, MD.

Haby, Jeff, "Cloud Detection (*IR* v. *VIS*)," (undated) [http://theweatherprediction.com/habyhints2/512/].

Graham, Steve, "Clouds & Radiation," Mar. 1, 1999. [http://earthobservatory.nasa.gov/Features/Clouds/].

National Aeronautics & Space Administration, "Cloud Radar System (CRS)," (undated) [http://har.gsfc.nasa.gov/index.php?section=12].

Science and Technology Facilities Council. "Cloud Radar: Predicting The Weather More Accurately." ScienceDaily, Oct. 1, 2008. [www.sciencedaily.com/releases/2008/09/080924085200.htm].

"Remote Sensing: Clouds," Department of Atmospheric and Ocean Science, University of Maryland, (undated) [http://www.atmos.umd.edu/~pinker/remote_sensing_clouds.htm].

National Aeronautics & Space Administration, "Cloud Remote Sensing and Modeling," (undated) [http://atmospheres.gsfc.nasa.gov/climate/index.php?section=134].

Kipp & Zonen, "Solar Radiation" (undated) [http://www.kippzonen.com/Knowledge-Center/Theoretical-info/Solar-Radiation].

Duchon, Claude E. et al., "Estimating Cloud Type from Pyranometer Observations," Journal of Applied Meteorology, vol. 38, Jan. 1999, pp. 132-141.

U.S. Appl. No. 14/535,080, filed Nov. 6, 2014 + preliminary amendment filed Nov. 7, 2014.

US Office Action dated Jan. 16, 2015 in U.S. Appl. No. 14/468,778.

International Preliminary Report on Patentability dated Feb. 19, 2015 issued in PCT/US2013/053625.

Third-Party Submission dated Feb. 2, 2015 and Feb. 18, 2015 PTO Notice re Third-Party Submission for U.S. Appl. No. 13/772,969.

US Office Action dated Feb. 24, 2015 in U.S. Appl. No. 14/163,026.

US Final Office Action dated Feb. 26, 2015 in U.S. Appl. No. 13/479,137.

\* cited by examiner

Position Across Device

DRIVING THIN FILM SWITCHABLE OPTICAL DEVICES

CROSS-REFERENCE TO RELATED APPLICATIONS

This application is a continuation-in-part of U.S. patent application Ser. No. 13/452,032, naming Jack et al. as inventors, and filed Apr. 20, 2012, which is incorporated herein by reference in its entirety and for all purposes; this application is also a continuation-in-part of U.S. patent application Ser. No. 13/449,248, naming Stephen C. Brown as inventor, and filed Apr. 17, 2012, which is incorporated herein by reference in its entirety and for all purposes; this application also claims benefit of U.S. Provisional Patent Application No. 61/680,221, naming Pradhan et al. as inventors, and filed Aug. 6, 2012, which is incorporated herein by reference in its entirety and for all purposes.

BACKGROUND

Electrochromic (EC) devices typically comprise a multi-layer stack including (a) at least one electrochromic material, that changes its optical properties, such as visible light transmitted through the layer, in response to the application of an electrical potential, (b) an ion conductor (IC), which allows ions (e.g. $Li^+$) to move through it, into and out from the electrochromic material to cause the optical property change, while insulating against electrical shorting, and (c) transparent conductor layers (e.g. transparent conducting oxides or TCOs), over which an electrical potential is applied. In some cases, the electric potential is applied from opposing edges of an electrochromic device and across the viewable area of the device. The transparent conductor layers are designed to have relatively high electronic conductances. Electrochromic devices may have more than the above-described layers, e.g., ion storage layers that color, or not.

Due to the physics of the device operation, proper function of the electrochromic device depends upon many factors such as ion movement through the material layers, the electrical potential required to move the ions, the sheet resistance of the transparent conductor layers, and other factors. As the size of electrochromic devices increases, conventional techniques for driving electrochromic transitions fall short. For example, in conventional driving profiles, the device is driven carefully, at sufficiently low voltages so as not to damage the device by driving ions through it too hard, which slows the switching speed, or the device is operated at higher voltages to increase switching speed, but at the cost of premature degradation of the device.

What are needed are improved methods for driving electrochromic devices.

SUMMARY

Aspects of this disclosure concern controllers and control methods for applying a drive voltage to bus bars of a large electrochromic device. Such devices are often provided on windows such as architectural glass. In certain embodiments, the applied drive voltage has a defined magnitude which is sufficient to drive a transition over the entire surface of the electrochromic device but which does not damage or degrade the device. The region equidistant between the bus bars experiences the lowest effective voltage and the regions proximate the bus bars experience the highest effective voltage. The applied drive voltage produces an effective voltage at all locations on the face of the electrochromic device that is within a bracketed range. The upper bound of this range is safely beneath the voltage at which it is believed that the device may experience damage or degradation that might impact its performance in the short term or the long term. At the lower boundary of this range is an effective voltage at which the transition between optical states of the electrochromic device occurs relatively rapidly. The level of voltage applied between the bus bars is significantly greater than the maximum value of effective voltage within the bracketed range.

One aspect of the present disclosure concerns controllers for controlling the optical state of a thin film electrochromic device. Such controllers may be characterized by (a) circuitry for applying voltage or providing instructions to apply voltage between bus bars on the thin film electrochromic device and (b) a processing component. The processing component (b) may be designed or configured to perform the following operations: (i) determine that the thin film electrochromic device should transition from a first optical state to a second optical state; and (ii) hold a first applied voltage between the bus bars of the thin film electrochromic device in response to determining that the thin film electrochromic device should transition from the first optical state to the second optical state. The magnitude of the first applied voltage is sufficient to ensure that at all locations on the thin film electrochromic device experience an effective voltage between a maximum effective voltage identified as safely avoiding damage to the thin film electrochromic device and a minimum effective voltage identified as sufficient to drive the transition from the first optical state to the second optical state. Additionally, the first applied voltage is significantly greater than the maximum effective voltage.

In certain embodiments, this is accomplished by maintaining an effective voltage at all locations on the thin film electrochromic device during the transition from the first optical state to the second optical state. In such cases, this is accomplished by lowering the magnitude of the first applied voltage between the bus bars from the first voltage during the course of the transition from the first optical state to the second optical state.

In a specific embodiment, the controller may have a maximum effective voltage of about 2.5 volts or lower and a minimum effective voltage of about 1.2 volts or higher.

Another aspect of the invention concerns electrochromic device and control systems that are characterized by controllers described above, with a thin film electrochromic device having bus bars electrically coupled to the controller.

In certain embodiments, the electrochromic device and control system has bus bars that are disposed at opposite sides of the thin film electrochromic device. In other cases, its bus bars are separated by a distance of at least about 30 inches. In yet other cases, its bus bars are separated by a distance of at least about 40 inches.

In certain embodiments, the thin film electrochromic device is disposed on architectural glass. In other embodiments, the thin film electrochromic device has a width of at least about 30 inches.

In one embodiment, the thin film electrochromic device has two transparent conductive layers, each with a sheet resistance $R_s$, and the bus bars are separated by a distance L, and the thin film electrochromic device has a value of $R_s * J * L^2$ of greater than about 3V.

Another aspect of the invention pertains to controllers for controlling the optical state of a thin film electrochromic device. Such controllers may be characterized by (a) circuitry for applying voltage or providing instructions to apply voltage between bus bars on the thin film electrochromic device and (b) a medium storing instructions for controlling the circuitry. The medium for storing instructions may include (i) code for determining that the thin film electrochromic device should transition from a first optical state to a second optical state; and (ii) code for holding a first applied voltage between the bus bars of the thin film electrochromic device in response to determining that the thin film electrochromic device should transition from the first optical state to the second optical state. Such a first applied voltage is chosen to ensure that at all locations on the thin film electrochromic device experience an effective voltage between a maximum effective voltage identified as safely avoiding damage to the thin film electrochromic device and a minimum effective voltage identified as sufficient to drive the transition from the first optical state to the second optical state. Also, such a first applied voltage is significantly greater than the maximum effective voltage.

In certain embodiments, the medium storing instructions is characterized by code for maintaining an effective voltage at all locations on the thin film electrochromic device during the transition from the first optical state to the second optical state. In this case, this is accomplished by having code for lowering the magnitude of the first applied voltage between the bus bars from the first voltage during the course of the transition from the first optical state to the second optical state.

Another feature of the medium storing instructions includes code for ramping the applied voltage to the bus bars at a defined ramp rate until reaching the first applied voltage. Yet another feature includes code for holding the first applied voltage to the bus bars for a defined period.

In addition, the medium storing instructions may also have code for ramping the applied voltage to the bus bars from the first applied voltage to a hold voltage having a smaller magnitude than the first applied voltage. In such an implementation, the code for ramping the applied voltage to the bus bars from the first applied voltage to a hold voltage specifies a defined ramp rate.

In certain implementations, the controllers may have a maximum effective voltage about 2.5 volts or lower and the minimum effective voltage is about 1.2 volts or higher. The controllers may provide a first applied voltage of between about 2.5 and 5 volts.

These and other features and advantages are described in more detail below with reference to the associated drawings.

DETAILED DESCRIPTION

Figure 1A:
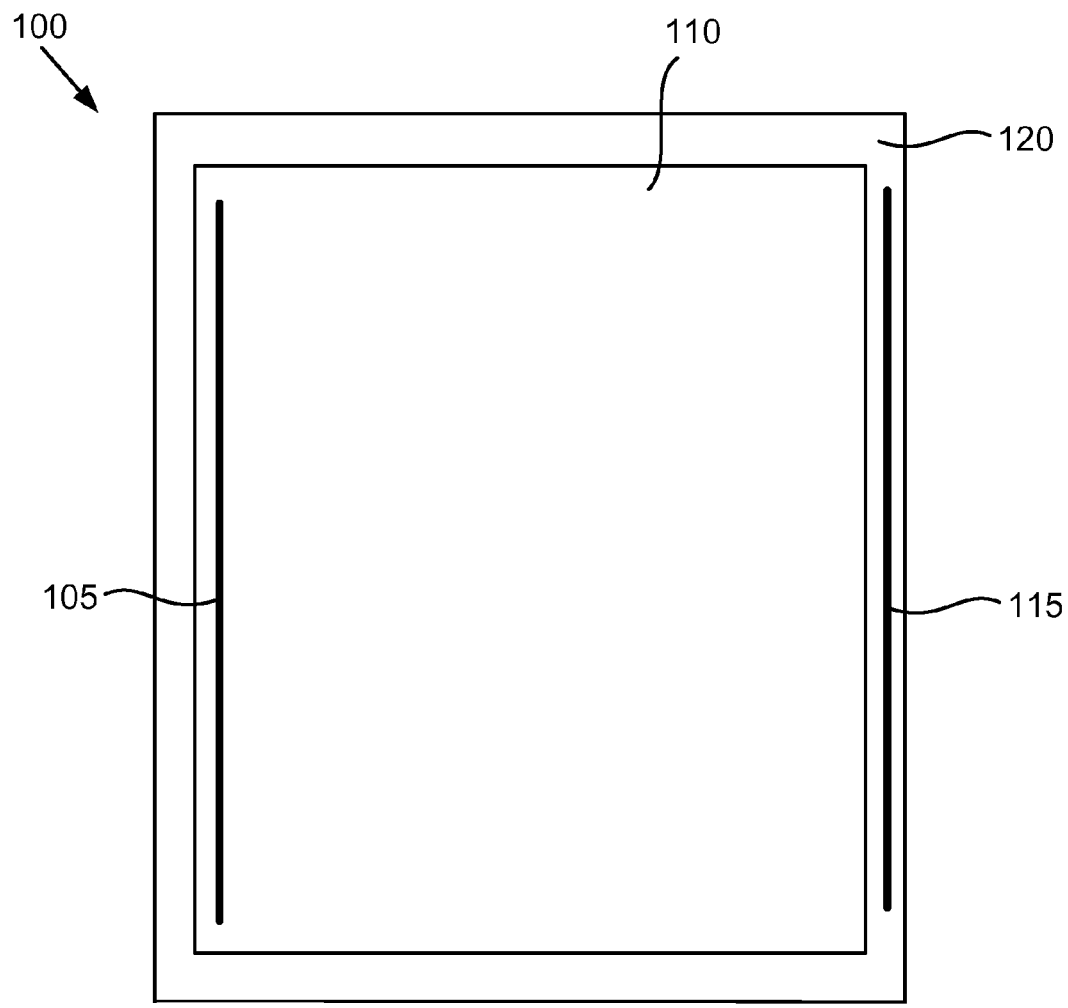
FIG. 1A schematically depicts a planar bus bar arrangement.

Driving a color transition in a typical electrochromic device is accomplished by applying a defined voltage to two separated bus bars on the device. In such a device, it is convenient to position bus bars perpendicular to the smaller dimension of a rectangular window (see FIG. 1A). This is because transparent conducting layers have an associated sheet resistance and this arrangement allows for the shortest span over which current must travel to cover the entire area of the device, thus lowering the time it takes for the conductor layers to be fully charged across their respective areas, and thus lowering the time to transition the device.

While an applied voltage, $V_{app}$, is supplied across the bus bars, essentially all areas of the device see a lower local effective voltage ($V_{eff}$) due to the sheet resistance of the transparent conducting layers and the ohmic drop in potential across the device. The center of the device (the position midway between the two bus bars) frequently has the lowest value of $V_{eff}$. This frequently results in an unacceptably small optical switching range and/or an unacceptably slow switching time in the center of the device. These problems may not exist at the edges of the device, nearer the bus bars. This is explained in more detail below with reference to FIGS. 1B and 1C.

As used herein, $V_{app}$ refers the difference in potential applied to two bus bars of opposite polarity on the electrochromic device. As explained below, each bus bar is electronically connected to a separate transparent conductive layer. Between the transparent conductive layers are sandwiched the electrochromic device materials. Each of the transparent conductive layers experiences a potential drop from a bus bar to which it is connected and a location remote from the bus bar. Generally, the greater the distance from the bus bar, the greater the potential drop in a transparent conducting layer. The local potential of the transparent conductive layers is often referred to herein as the $V_{TCL}$. As indicated, bus bars of opposite polarity are typically laterally separated from one another across the face of the electrochromic device. The term $V_{eff}$ refers to the potential between the positive and negative transparent conducting layers at any particular location on the electrochromic device (x,y coordinate in Cartesian space). At the point where $V_{eff}$ is measured, the two transparent conducting layers are separated in the z-direction (by the EC device materials), but share the same x,y coordinate.

Aspects of this disclosure concern controllers and control methods in which a voltage applied to the bus bars is at a level that drives a transition over the entire surface of the electrochromic device but does not damage or degrade the device. This applied voltage produces an effective voltage at all locations on the face of the electrochromic device that is within a bracketed range. The upper bound of this range is associated with a voltage safely below the level at which the device may experience damage or degradation impacting its performance in the short term or the long term. At the lower boundary of this range is an effective voltage at which the transition between optical states of the electrochromic device occurs relatively rapidly. The level of voltage applied between the bus bars is significantly greater than the maximum value of $V_{eff}$ within the bracketed range.

FIG. 1A shows a top-down view of an electrochromic lite, 100, including bus bars having a planar configuration. Electrochromic lite 100 includes a first bus bar, 105, disposed on a first conductive layer, 110, and a second bus bar, 115, disposed on a second conductive layer, 120. An electrochromic stack (not shown) is sandwiched between first conductive layer 110 and second conductive layer 120. As shown, first bus bar 105 may extend substantially across one side of first conductive layer 110. Second bus bar 115 may extend substantially across one side of second conductive layer 120 opposite the side of electrochromic lite 100 on which first bus bar 105 is disposed. Some devices may have extra bus bars, e.g. on all four edges, but this complicates fabrication. A further discussion of bus bar configurations, including planar configured bus bars, is found in U.S. patent application Ser. No. 13/452,032 filed Apr. 20, 2012, which is incorporated herein by reference in its entirety.

Figure 1B:
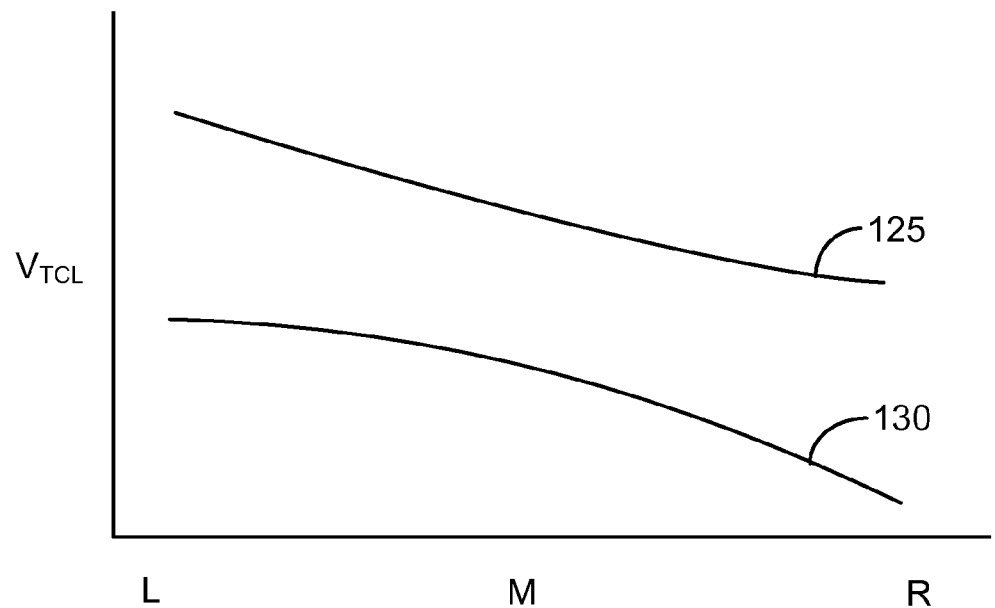
FIG. 1B presents a simplified plot of the local voltage value on each transparent conductive layer as a function of position on the layer

FIG. 1B is a graph showing a plot of the local voltage in first transparent conductive layer 110 and the voltage in second transparent conductive layer 120 that drives the transition of electrochromic lite 100 from a bleached state to a colored state, for example. Plot 125 shows the local values of $V_{TCL}$ in first transparent conductive layer 110. As shown, the voltage drops from the left hand side (e.g., where first bus bar 105 is disposed on first conductive layer 110 and where the voltage is applied) to the right hand side of first conductive layer 110 due to the sheet resistance and current passing through first conductive layer 110. Plot 130 also shows the local voltage $V_{TCL}$ in second conductive layer 120. As shown, the voltage increases from the right hand side (e.g., where second bus bar 115 is disposed on second conductive layer 120 and where the voltage is applied) to the left hand side of second conductive layer 120 due to the sheet resistance of second conductive layer 120. The value of $V_{app}$ in this example is the difference in voltage between the right end of potential plot 130 and the left end of potential plot 125. The value of $V_{eff}$ at any location between the bus bars is the difference in values of curves 130 and 125 the position on the x-axis corresponding to the location of interest.

Figure 1C:
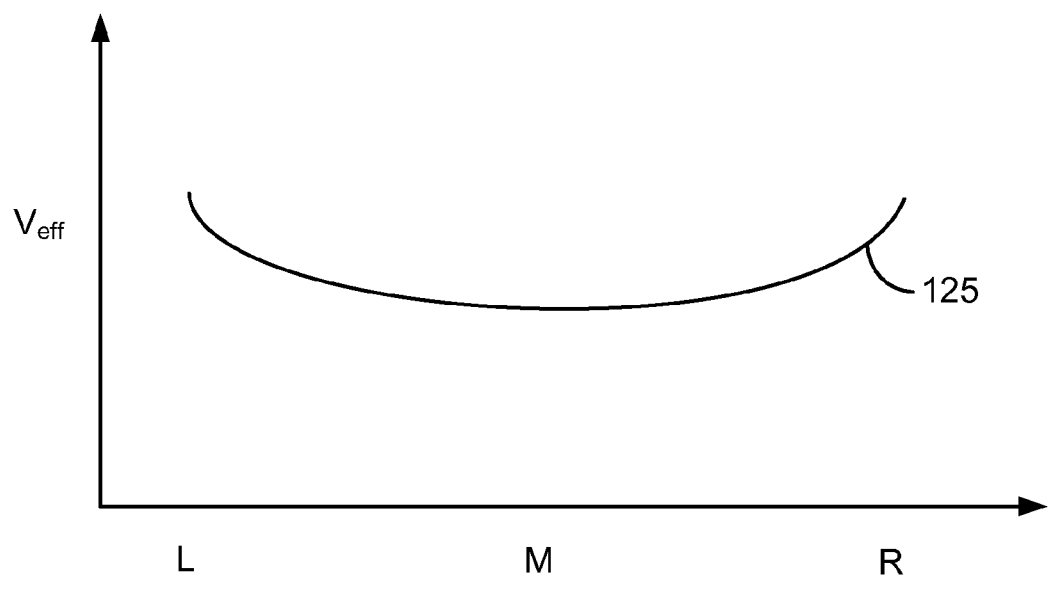
FIG. 1C presents a simplified plot of $V_{eff}$ as a function of position across the device

FIG. 1C is a graph showing a plot of $V_{eff}$ across the electrochromic device between first and second conductive layers 110 and 120 of electrochromic lite 100. As explained, the effective voltage is the local voltage difference between the first conductive layer 110 and the second conductive layer 120. Regions of an electrochromic device subjected to higher effective voltages transition between optical states faster than regions subjected to lower effective voltages. As shown, the effective voltage is the lowest at the center of electrochromic lite 100 and highest at the edges of electrochromic lite 100. The voltage drop across the device is an ohmic drop due to the current passing through the device (which is a sum of the electronic current between the layers capable of undergoing redox reactions in the electrochromic device and ionic current associated with the redox reaction). The voltage drop across large electrochromic windows can be alleviated by configuring additional bus bars within the viewing area of the window, in effect dividing one large optical window into multiple smaller electrochromic windows which can be driven in series or parallel. However, this approach is not aesthetically preferred due to the contrast between the viewable area and the bus bar(s) in the viewable area. That is, it is much more pleasing to the eye to have a monolithic electrochromic device without any distracting bus bars in the viewable area.

As described above, as the window size increases, the resistance of the TCO layers between the points closest to the bus bar (referred to as edge of the device in following description) and in the points furthest away from the bus bars (referred to as the center of the device in following description) increases. For a fixed current passing through a TCO the effective voltage drop across the TCO increases and this reduces the effective voltage at the center of the device. This effect is exacerbated by the fact that typically as window area increases, the leakage current density for the window stays constant but the total leakage current increases due to the increased area. Thus with both of these effects the effective voltage at the center of the electrochromic window falls substantially, and poor performance may be observed for electrochromic windows which are larger than, for example, about 30 inches across. Some of the poor performance can be alleviated by using a higher $V_{app}$ such that the center of the device reaches a suitable effective voltage; however, the problem with this approach is that typical higher voltages at the edge of the window, needed to reach the suitable voltage at the center, can degrade the electrochromic device in the edge area, which can lead to poor performance.

Typically the range of safe operation for solid state electrochromic-device based windows is between about 0.5V and 4V, or more typically between about 1V and about 3V, e.g. between 1.1V and 1.8V. These are local values of $V_{eff}$. In one embodiment, an electrochromic device controller or control algorithm provides a driving profile where $V_{eff}$ is always below 3V, in another embodiment, the controller controls $V_{eff}$ so that it is always below 2.5V, in another embodiment, the controller controls $V_{eff}$ so that it is always below 1.8V. Those of ordinary skill in the art will understand that these ranges are applicable to both transitions between optical states of the devices (e.g. transitions from bleached (clear) to tinted and from tinted to bleached in an absorptive device) and that the value of $V_{eff}$ for a particular transition may be different. The recited voltage values refer to the time averaged voltage (where the averaging time is of the order of time required for small optical response, e.g. few seconds to few minutes). Those of ordinary skill in the art will also understand that this description is applicable to various types of drive mechanism including fixed voltage (fixed DC), fixed polarity (time varying DC) or a reversing polarity (AC, MF, RF power etc. with a DC bias).

An added complexity of electrochromic windows is that the current drawn through the window is not fixed over time. Instead, during the initial transition from one state to the other, the current through the device is substantially larger (up to 30× larger) than in the end state when the optical transition is complete. The problem of poor coloration in center of the device is further exacerbated during this initial transition period, as the $V_{eff}$ at the center is even lower than what it will be at the end of the transition period.

Electrochromic device controllers and control algorithms described herein overcome the above-described issues. As mentioned, the applied voltage produces an effective voltage at all locations on the face of the electrochromic device that is within a bracketed range, and the level of voltage applied between the bus bars is significantly greater than the maximum value of $V_{eff}$ within the bracketed range.

In the case of an electrochromic device with a planar bus bar, it can be shown that the $V_{eff}$ across a device with planar bus bars is generally given by:

$$\Delta V(0) = V_{app} - RJL^2/2$$

$$\Delta V(L) = V_{app} - RJL^2/2$$

$$\Delta V(L/2) = V_{app} - 3RJL^2/4 \quad \text{Equation 1}$$

where:
$V_{app}$ is the voltage difference applied to the bus bars to drive the electrochromic window;
$\Delta V(0)$ is $V_{eff}$ at the bus bar connected to the first transparent conducting layer (in the example below, TEC type TCO);
$\Delta V(L)$ is $V_{eff}$ at the bus bar connected to the second transparent conducting layer (in the example below, ITO type TCO);
$\Delta V(L/2)$ is $V_{eff}$ at the center of the device, midway between the two planar bus bars;
R=transparent conducting layer sheet resistance;
J=instantaneous local current density; and
L=distance between the bus bars of the electrochromic device.

The transparent conducting layers are assumed to have substantially similar, if not the same, sheet resistance for the calculation. However those of ordinary skill in the art will appreciate that the applicable physics of the ohmic voltage drop and local effective voltage still apply even if the transparent conducting layers have dissimilar sheet resistances.

As noted, certain embodiments pertain to controllers and control algorithms for driving optical transitions in devices having planar bus bars. In such devices, substantially linear bus bars of opposite polarity are disposed at opposite sides of a rectangular or other polygonally shaped electrochromic device. In some embodiments, devices with non-planar bus bars may be employed. Such devices may employ, for example, angled bus bars disposed at vertices of the device. In such devices, the bus bar effective separation distance, L, is determined based on the geometry of the device and bus bars. A discussion of bus bar geometries and separation distances may be found in U.S. patent application Ser. No. 13/452,032, entitled "Angled Bus Bar", and filed Apr. 20, 2012, which is incorporated herein by reference in its entirety.

Figure 2:
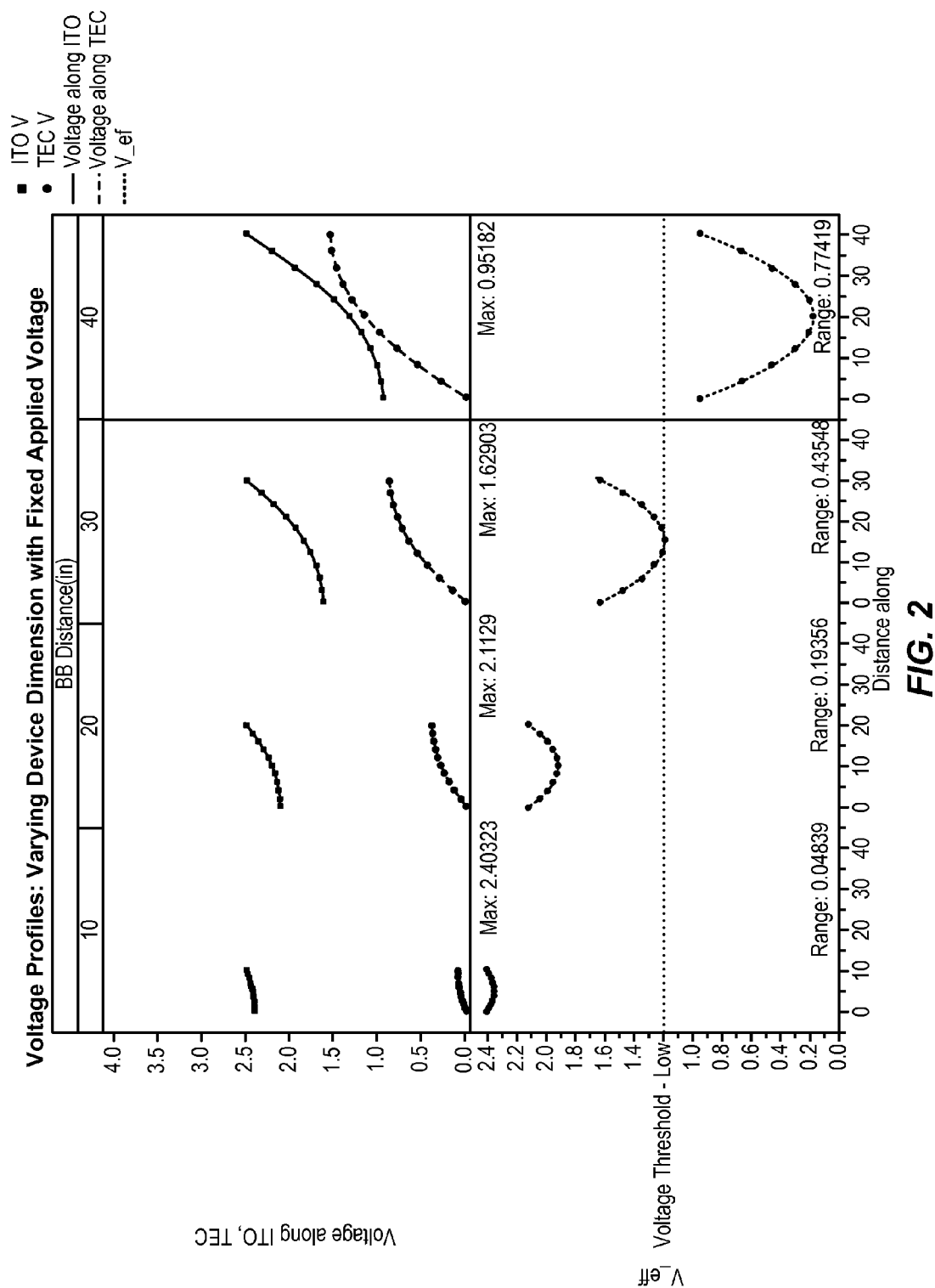
FIG. 2 depicts voltage profiles for various device dimensions (bus bar separation) with a fixed value of $V_{app}$.

As R, J or L increase, $V_{eff}$ across the device decreases, thereby slowing or reducing the device coloration during transition and even in the final optical state. As shown in FIG. 2, as the bus bar distance increases from 10 inches to 40 inches the voltage drop across the TEC and ITO layers (curves in upper plot) increases and this causes the $V_{eff}$ (lower curves) to fall across the device.

Thus, using conventional driving algorithms, 10 inch and 20 inch electrochromic windows can be made to switch effectively, while 30 inch windows would have marginal performance in the center and 40 inch windows would not show good performance across the window. This limits scaling of electrochromic technology to larger size windows.

Again referring to Equation 1, the $V_{eff}$ across the window is at least $RJL^2/2$ lower than $V_{app}$. It has been found that as the resistive voltage drop increases (due to increase in the window size, current draw etc.) some of the loss can be negated by increasing $V_{app}$ but doing so only to a value that keeps $V_{eff}$ at the edges of the device below the threshold where reliability degradation would occur. In other words, it has been recognized that both transparent conducting layers experience ohmic drop, and that drop increases with distance from the associated bus bar, and therefore $V_{TCL}$ decreases with distance from the bus bar for both transparent conductive layers and as a consequence $V_{eff}$ decreases across the whole electrochromic window.

While the applied voltage is increased to a level well above the upper bound of a safe $V_{eff}$, $V_{eff}$ in fact never actually approaches this high value of the applied voltage. At locations near the bus bars, the voltage of the attached transparent conductive layers contacting the bus bars is quite high, but at the same location, the voltage of the opposite polarity transparent conductive layers falls reasonably close to the applied potential by the ohmic drop across the faces of the conductive layers. The driving algorithms described herein take this into account. In other words, the voltage applied to the bus bars can be higher than conventionally thought possible. A high $V_{app}$ provided at bus bars might be assumed to present too high of a $V_{eff}$ near the bus bars. However, by employing a $V_{app}$ that accounts for the size of the window and the ohmic drop in the transparent conducting layers, a safe but appropriately high $V_{eff}$ results over the entire surface of the electrochromic device. The appropriate $V_{app}$ applied to the bus bars is greater in larger devices than in smaller devices. This is illustrated in more detail in FIG. 3 and the associated description.

Figure 3:
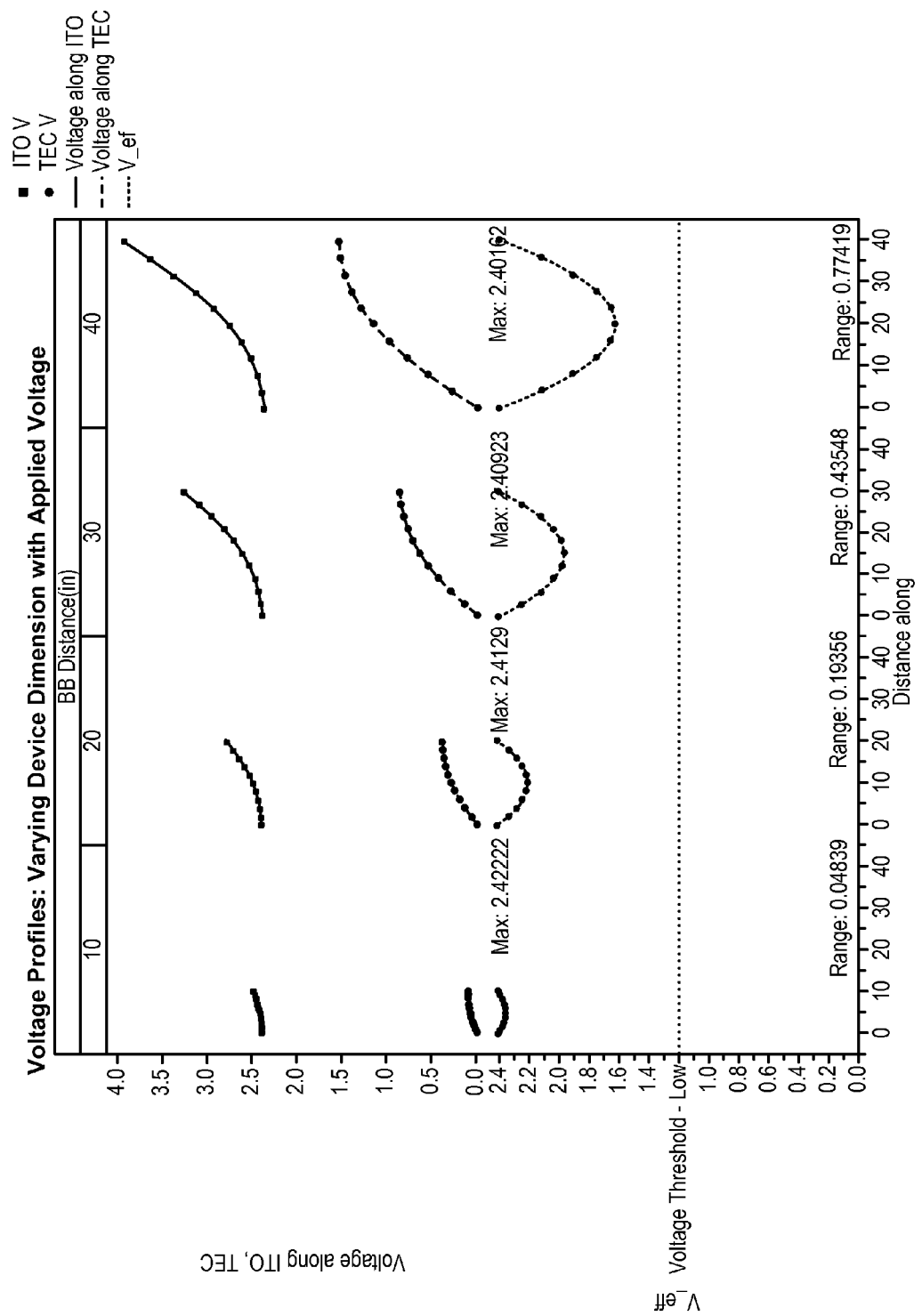
FIG. 3 depicts voltage profiles for various device dimensions with $V_{app}$ supplied at different values as necessary to maintain $V_{eff}$ at suitable levels.

Referring to FIG. 3, the electrochromic device is driven using control mechanisms that apply $V_{app}$ so that $V_{eff}$ remains solidly above the threshold voltage of 1.2V (compare to FIG. 2). The increase in $V_{app}$ required can be seen in the maximum value of $V_{TCL}$ increasing from about 2.5V to about 4V. However this does not lead to increase in the $V_{eff}$ near the bus bars, where it stays at about 2.4V for all devices.

Figure 4:
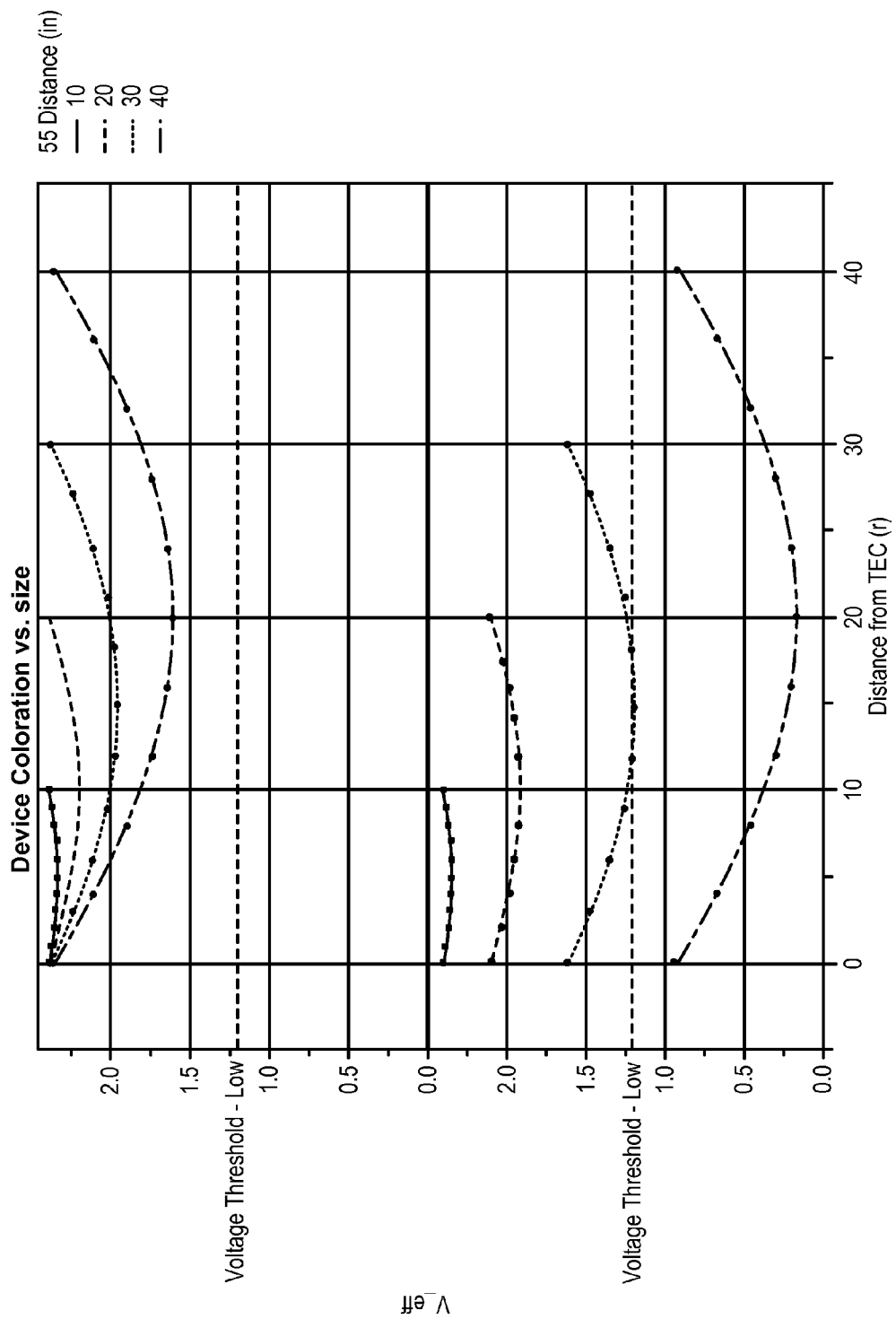
FIG. 4 presents device coloration profiles ($V_{eff}$ versus position) for various device dimensions using fixed and variable $V_{app}$. In each set of four curves, the upper curve is for the smallest device (10 inches) and the lowest curve is for the largest device (40 inches).

FIG. 4 is a plot comparing a conventional approach in $V_{app}$ is fixed for devices of different sizes a new approach in which $V_{app}$ varies for devices of different sizes. By adjusting $V_{app}$ for device size, the drive algorithms allow the performance (switching speed) of large electrochromic windows to be improved substantially without increasing risk of device degradation, because $V_{eff}$ is maintained above the threshold voltage in all cases but within a safe range. Drive algorithms tailored for a given window's metrics, e.g. window size, transparent conductive layer type, Rs, instantaneous current density through the device, etc., allow substantially larger electrochromic windows to function with suitable switching speed not otherwise possible without device degradation.

$V_{eff}$ and $V_{app}$ Parameters

Controlling the upper and lower bounds of the range of $V_{eff}$ over the entire surface of the electrochromic device will now be further described. As mentioned, when $V_{eff}$ is too high it damages or degrades the electrochromic device at the location(s) where it is high. The damage or degradation may be manifest as an irreversible electrochromic reaction which can reduce the optical switching range, degradation of aesthetics (appearance of pinholes, localized change in film appearance), increase in leakage current, film delamination etc. For many devices, the maximum value of $V_{eff}$ is about 4 volts or about 3 volts or about 2.5 volts or about 1.8 volts. In some embodiments, the upper bound of $V_{eff}$ is chosen to include a buffer range such that the maximum value of $V_{eff}$ is below the actual value expected to produce degradation. The difference between this actual value and the maximum value of $V_{eff}$ is the size of the buffer. In certain embodiments, the buffer value is between about 0.2 and 0.6 volts.

The lower boundary of the range of effective voltages should be chosen to provide an acceptable and effective transition between optical states of the electrochromic device. This transition may be characterized in terms of the speed at which the transition occurs after the voltage is applied, as well as other effects associated with the transition such as curtaining (non-uniform tinting across the face of the electrochromic device). As an example, the minimum value of $V_{eff}$ may be chosen to effect a complete optical transition (e.g., fully bleached to fully tinted) over the face of the device of about 45 minutes or less, or about 10 minutes or less. For many devices, the maximum value of $V_{eff}$ is about 0.5 volts or about 0.7 volts or about 1 volt or about 1.2 volts.

For devices having 3 or more states, the target range of $V_{eff}$ typically will not impact attaining and maintaining intermediate states in a multi-state electrochromic device. Intermediate states are driven at voltages between the end states, and hence $V_{eff}$ is always maintained within a safe range.

As mentioned, for large electrochromic devices the value of $V_{app}$ may be greater than the maximum acceptable value of $V_{eff}$. Thus, in some embodiments, $V_{app}$ is greater (by any amount) than the maximum value of $V_{eff}$. However, in some implementations, the difference between $V_{app}$ and the maximum value of $V_{eff}$ has at least a defined magnitude. For example, the difference may be about 0.5 volts or about 1 volt, or about 1.5 volts, or about 2 volts. It should be understood that the difference between the value of $V_{app}$ and the maximum value of $V_{eff}$ is determined in part by the separation distance between the bus bars in the device and possibly other parameters such as the sheet resistance of the device's transparent conductive layers and leakage current. As an example, if the leakage current of the device is quite low, then the difference between $V_{eff}$ and $V_{app}$ may be smaller than it otherwise might be.

As noted, the disclosed control algorithms are particularly useful in devices having large dimensions: e.g., large electrochromic windows. Technically, the size is determined by the effective separation distance between bus bars, L. In some embodiments, the devices have a value of L of at least about 30 inches, or at least about 40 inches, or at least about 50 inches or at least about 60 inches. The separation distance is not the only parameter that impacts the need for using an appropriately large value of $V_{app}$ to drive a transition. Other parameters include the sheet resistances of the transparent conductive layers and the current density in the device during optical switching. In some embodiments, a combination of these and/or other parameters is employed to determine when to apply the large value of $V_{app}$. The parameters interoperate and collectively indicate whether or not there is a sufficiently large ohmic voltage drop across the face of a transparent conductive layer to require a large applied voltage.

In certain embodiments, a combination of parameters (e.g., a dimensionless number) may be used to determine appropriate operating ranges. For example, a voltage loss parameter ($V_{loss}$) can be used to define conditions under which a typical control algorithm would not work and the disclosed approach would be well suited to handle. In certain embodiments, the $V_{loss}$ parameter is defined as $RJL^2$ (where L is the separation distance between bus bar, and R is the sheet resistance of a transparent conductive layer). In some implementations, the approaches described herein are most useful when $V_{loss}$ is greater than about 3V or more specifically greater than about 2V or more specifically greater than about 1V.

$V_{app}$ Profile During Transition.

The current responsible for the ohmic voltage drop across the face of the transparent conductive layers has two components. It includes ionic current used to drive the optical transition and parasitic electronic current through the electrolyte or ion conducting layer. The parasitic electronic current should be relatively constant for a given value of the applied voltage. It may also be referred to as leakage current. The ionic current is due to the lithium ions moving between the electrochromic layer and a counter electrode layer to drive the optical transition. For a given applied voltage, the ionic current will undergo change during the transition. Prior to application of any $V_{app}$, the ionic current is small or non-existent. Upon application of $V_{app}$, the ionic current may grow and may even continue to after the applied voltage is held constant. Eventually, however, the ionic current will peak and drop off as all of the available ions move between the electrodes during the optical transition. After the optical transition is complete, only leakage current (electronic current through the electrolyte) continues. The value of this leakage current is a function of the effective voltage, which is a function of the applied voltage. As described in more detail below, by modifying the applied voltage after the optical transition is complete, the control technique reduces the amount of leakage current and the value of $V_{eff}$.

In some embodiments, the control techniques for driving optical transitions are designed with a varying $V_{app}$ that keeps the maximum $V_{eff}$ below a particular level (e.g., 2.5V) during the entire course of the optical transition. In certain embodiments, $V_{app}$ is varied over time during transition from one state to another of the electrochromic device. The variation in $V_{app}$ is determined, at least in part, as a function of $V_{eff}$. In certain embodiments, $V_{app}$ is adjusted over the time of transition in a manner that maintains an acceptable $V_{eff}$ so as not to degrade device function.

Without adjusting $V_{app}$ during the optical transition, $V_{eff}$ could grow too large as the ionic current decays over the course of the transition. To maintain $V_{eff}$ at a safe level, $V_{app}$ may be decreased when the device current is largely leakage current. In certain embodiments, adjustment of $V_{app}$ is accomplished by a "ramp to hold" portion of a drive voltage profile as described below.

Figure 5:
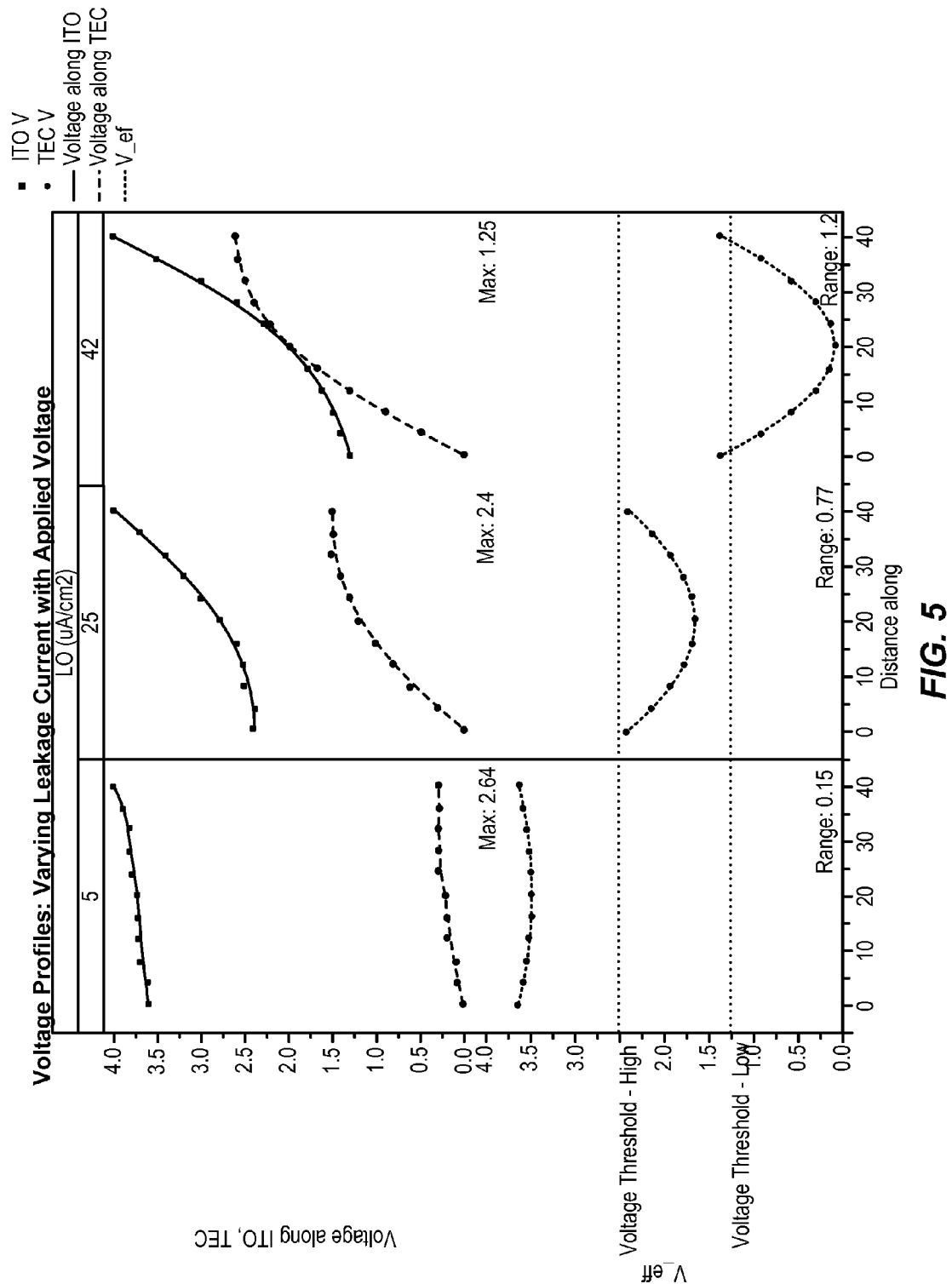
FIG. 5 shows $V_{TCL}$ and $V_{eff}$ as a function of device position for three different device dimensions when using a fixed conventional value of $V_{app}$.

In certain embodiments, $V_{app}$ is chosen and adjusted based on the instantaneous current draw (J) during an optical transition. Initially, during such transition, $V_{app}$ is higher to account for the larger voltage draw. FIG. 5 shows impact of current draw on $V_{eff}$ for a fixed window size (40 inches) using conventional drive algorithms. In this example, the drive profile accounts for a medium current draw scenario (25 $\mu A/cm^2$) which leads to very low $V_{eff}$ during initial switching when the current draw is high (42 $\mu A/cm^2$) which leads to substantially longer switching times. In addition, after the transition is complete and the window reaches the low current draw configuration (5 $\mu A/cm^2$), $V_{eff}$ is much higher (3.64V) than during transition. Since this is above the voltage threshold of safe operation this would be a long term reliability risk.

Figure 6:
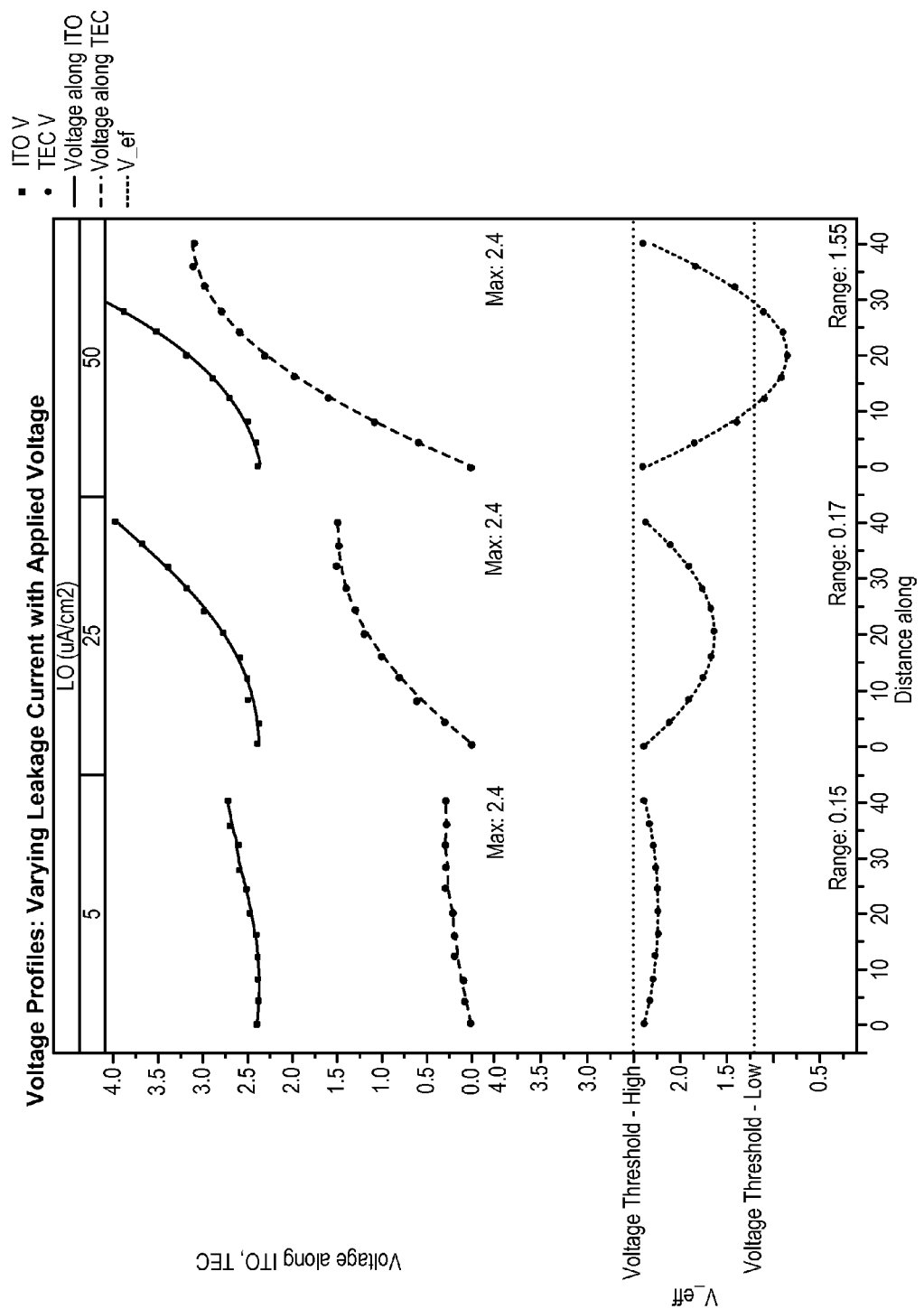
FIG. 6 shows $V_{TCL}$ and $V_{eff}$ as a function of device position for three different device dimensions when using variable values of $V_{app}$ optimized for driving transitions while maintaining safe $V_{eff}$.

FIG. 6 illustrates certain voltage control techniques that take into account the instantaneous current draw. In the depicted embodiment, the low current draw and high current draw conditions are now robustly within the required voltage window. Even for the high current draw condition, a large fraction of the device is now above the voltage threshold improving the switching speed of this device. Drive profiles can be simplified by choosing a voltage ramp rate that allows the instantaneous voltage to be close to the desired set point rather than requiring a feedback loop on the voltage.

Figure 7:
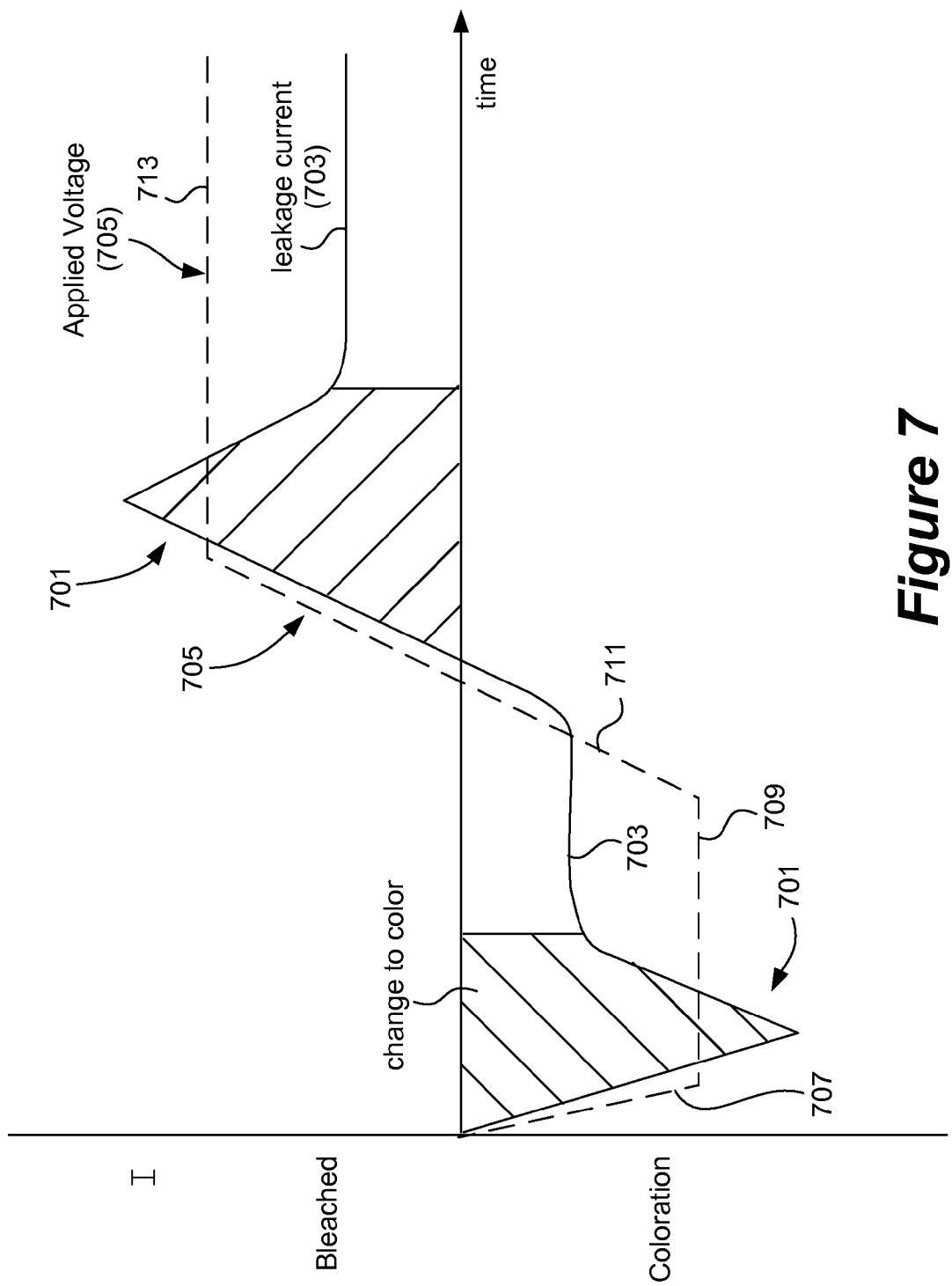
FIG. 7 is a graph depicting voltage and current profiles associated with driving an electrochromic device from bleached to colored and from colored to bleached.

FIG. 7 shows a complete current profile and voltage profile for an electrochromic device employing a simple voltage control algorithm to cause an optical state transition cycle (coloration followed by bleaching) of an electrochromic device. In the graph, total current density (I) is represented as a function of time. As mentioned, the total current density is a combination of the ionic current density associated with an electrochromic transition and electronic leakage current between the electrochemically active electrodes. Many different types electrochomic device will have the depicted current profile. In one example, a cathodic electrochromic material such as tungsten oxide is used in conjunction with an anodic electrochromic material such as nickel tungsten oxide in counter electrode. In such devices, negative currents indicate coloration of the device. In one example, lithium ions flow from a nickel tungsten oxide anodically coloring electrochromic electrode into a tungsten oxide cathodically coloring electrochromic electrode. Correspondingly, electrons flow into the tungsten oxide electrode to compensate for the positively charged incoming lithium ions. Therefore, the voltage and current are shown to have a negative value.

The depicted profile results from ramping up the voltage to a set level and then holding the voltage to maintain the optical state. The current peaks 701 are associated with changes in optical state, i.e., coloration and bleaching. Specifically, the current peaks represent delivery of the ionic charge needed to color or bleach the device. Mathematically, the shaded area under the peak represents the total charge required to color or bleach the device. The portions of the curve after the initial current spikes (portions 703) represent electronic leakage current while the device is in the new optical state.

In the figure, a voltage profile 705 is superimposed on the current curve. The voltage profile follows the sequence: negative ramp (707), negative hold (709), positive ramp (711), and positive hold (713). Note that the voltage remains constant after reaching its maximum magnitude and during the length of time that the device remains in its defined optical state. Voltage ramp 707 drives the device to its new the colored state and voltage hold 709 maintains the device in the colored state until voltage ramp 711 in the opposite direction drives the transition from colored to bleached states. In some switching algorithms, a current cap is imposed. That is, the current is not permitted to exceed a defined level in order to prevent damaging the device. The coloration speed is a function of not only the applied voltage, but also the temperature and the voltage ramping rate.

Figure 8:
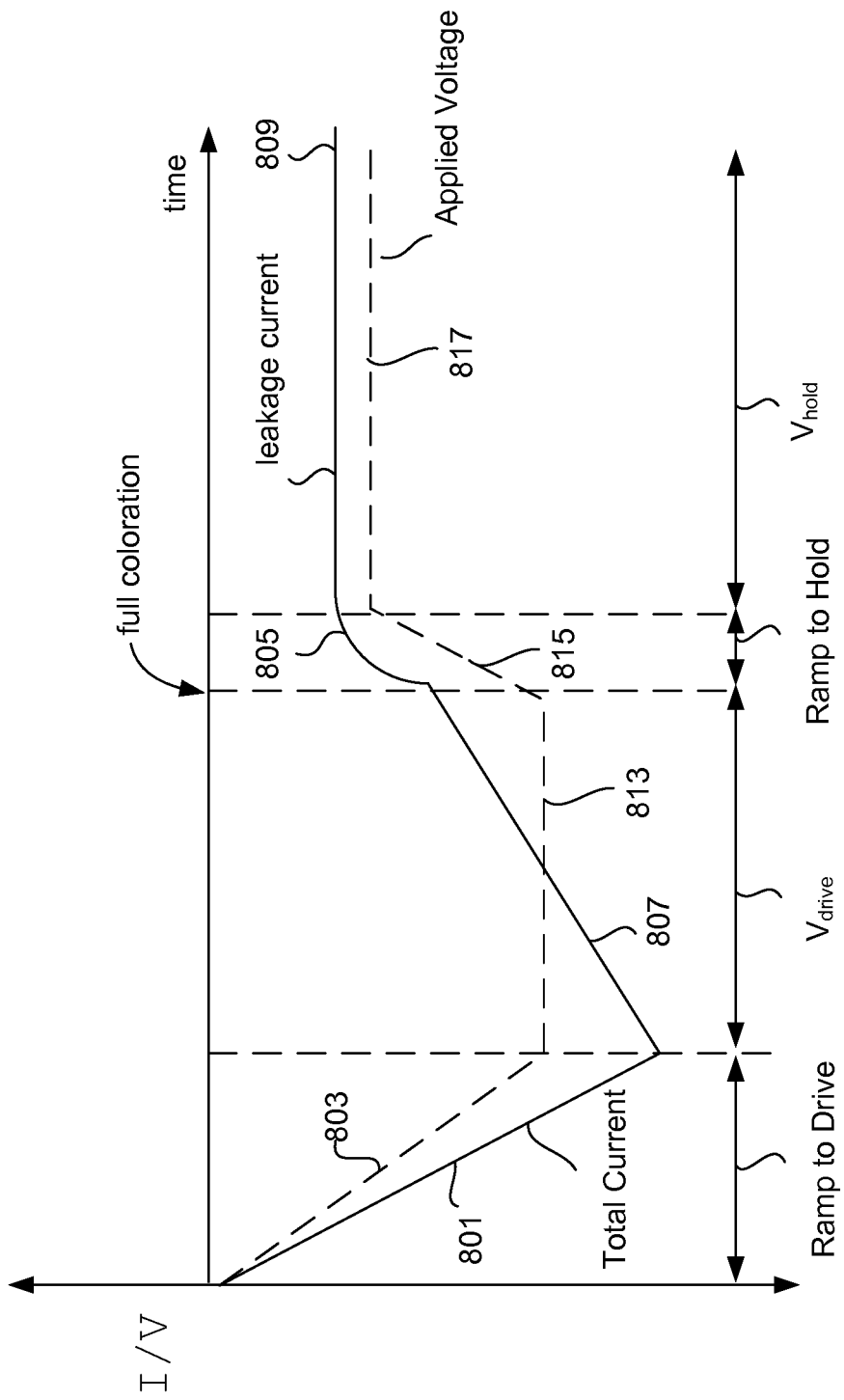
FIG. 8 is a graph depicting certain voltage and current profiles associated with driving an electrochromic device from bleached to colored.

FIG. 8 describes a voltage control profile in accordance with certain embodiments. In the depicted embodiment, a voltage control profile is employed to drive the transition from a bleached state to a colored state (or to an intermediate state). To drive an electrochromic device in the reverse direction, from a colored state to a bleached state (or from a more colored to less colored state), a similar but inverted profile is used. In some embodiments, the voltage control profile for going from colored to bleached is a mirror image of the one depicted in FIG. 8.

The voltage values depicted in FIG. 8 represent the applied voltage ($V_{app}$) values. The applied voltage profile is shown by the dashed line. For contrast, the current density in the device is shown by the solid line. In the depicted profile, $V_{app}$ includes four components: a ramp to drive component 803, which initiates the transition, a $V_{drive}$ component 813, which continues to drive the transition, a ramp to hold component 815, and a $V_{hold}$ component 817. The ramp components are implemented as variations in $V_{app}$ and the $V_{drive}$ and $V_{hold}$ components provide constant or substantially constant $V_{app}$ magnitudes.

The ramp to drive component is characterized by a ramp rate (increasing magnitude) and a magnitude of $V_{drive}$. When the magnitude of the applied voltage reaches $V_{drive}$, the ramp to drive component is completed. The $V_{drive}$ component is characterized by the value of $V_{drive}$ as well as the duration of $V_{drive}$. The magnitude of $V_{drive}$ may be chosen to maintain $V_{eff}$ with a safe but effective range over the entire face of the electrochromic device as described above.

The ramp to hold component is characterized by a voltage ramp rate (decreasing magnitude) and the value of $V_{hold}$ (or optionally the difference between $V_{drive}$ and $V_{hold}$). $V_{app}$ drops according to the ramp rate until the value of $V_{hold}$ is reached. The $V_{hold}$ component is characterized by the magnitude of $V_{hold}$ and the duration of $V_{hold}$. Actually, the duration of $V_{hold}$ is typically governed by the length of time that the device is held in the colored state (or conversely in the bleached state). Unlike the ramp to drive, $V_{drive}$, and ramp to hold components, the $V_{hold}$ component has an arbitrary length, which is independent of the physics of the optical transition of the device.

Each type of electrochromic device will have its own characteristic components of the voltage profile for driving the optical transition. For example, a relatively large device and/or one with a more resistive conductive layer will require a higher value of $V_{drive}$ and possibly a higher ramp rate in the ramp to drive component. Larger devices may also require higher values of $V_{hold}$. U.S. patent application Ser. No. 13/449,251, filed Apr. 17, 2012, and incorporated herein by reference discloses controllers and associated algorithms for driving optical transitions over a wide range of conditions. As explained therein, each of the components of an applied voltage profile (ramp to drive, $V_{drive}$, ramp to hold, and $V_{hold}$, herein) may be independently controlled to address real-time conditions such as current temperature, current level of transmissivity, etc. In some embodiments, the values of each component of the applied voltage profile is set for a particular electrochromic device (having its own bus bar separation, resistivity, etc.) and does vary based on current conditions. In other words, in such embodiments, the voltage profile does not take into account feedback such as temperature, current density, and the like.

As indicated, all voltage values shown in the voltage transition profile of FIG. 8 correspond to the $V_{app}$ values described above. They do not correspond to the $V_{eff}$ values described above. In other words, the voltage values depicted in FIG. 8 are representative of the voltage difference between the bus bars of opposite polarity on the electrochromic device.

In certain embodiments, the ramp to drive component of the voltage profile is chosen to safely but rapidly induce ionic current to flow between the electrochromic and counter electrodes. As shown in FIG. 8, the current in the device follows the profile of the ramp to drive voltage component until the ramp to drive portion of the profile ends and the $V_{drive}$ portion begins. See current component 801 in FIG. 8. Safe levels of current and voltage can be determined empirically or based on other feedback. U.S. Pat. No. 8,254,013, filed Mar. 16, 2011, issued Aug. 28, 2012 and incorporated herein by reference, presents examples of algorithms for maintaining safe current levels during electrochromic device transitions.

In certain embodiments, the value of $V_{drive}$ is chosen based on the considerations described above. Particularly, it is chosen so that the value of $V_{eff}$ over the entire surface of the electrochromic device remains within a range that effectively and safely transitions large electrochromic devices. The duration of $V_{drive}$ can be chosen based on various considerations. One of these ensures that the drive potential is held for a period sufficient to cause the substantial coloration of the device. For this purpose, the duration of $V_{drive}$ may be determined empirically, by monitoring the optical density of the device as a function of the length of time that $V_{drive}$ remains in place. In some embodiments, the duration of $V_{drive}$ is set to a specified time period. In another embodiment, the duration of $V_{drive}$ is set to correspond to a desired amount of ionic charge being passed. As shown, the current ramps down during $V_{drive}$. See current segment 807.

Another consideration is the reduction in current density in the device as the ionic current decays as a consequence of the available lithium ions completing their journey from the anodic coloring electrode to the cathodic coloring electrode (or counter electrode) during the optical transition. When the transition is complete, the only current flowing across device is leakage current through the ion conducting layer. As a consequence, the ohmic drop in potential across the face of the device decreases and the local values of $V_{eff}$ increase.

These increased values of $V_{eff}$ can damage or degrade the device if the applied voltage is not reduced. Thus, another consideration in determining the duration of $V_{drive}$ is the goal of reducing the level of $V_{eff}$ associated with leakage current. By dropping the applied voltage from $V_{drive}$ to $V_{hold}$, not only is $V_{eff}$ reduced on the face of the device but leakage current decreases as well. As shown in FIG. 8, the device current transitions in a segment 805 during the ramp to hold component. The current settles to a stable leakage current 809 during $V_{hold}$.

Electrochromic Devices and Controllers

Figure 9:
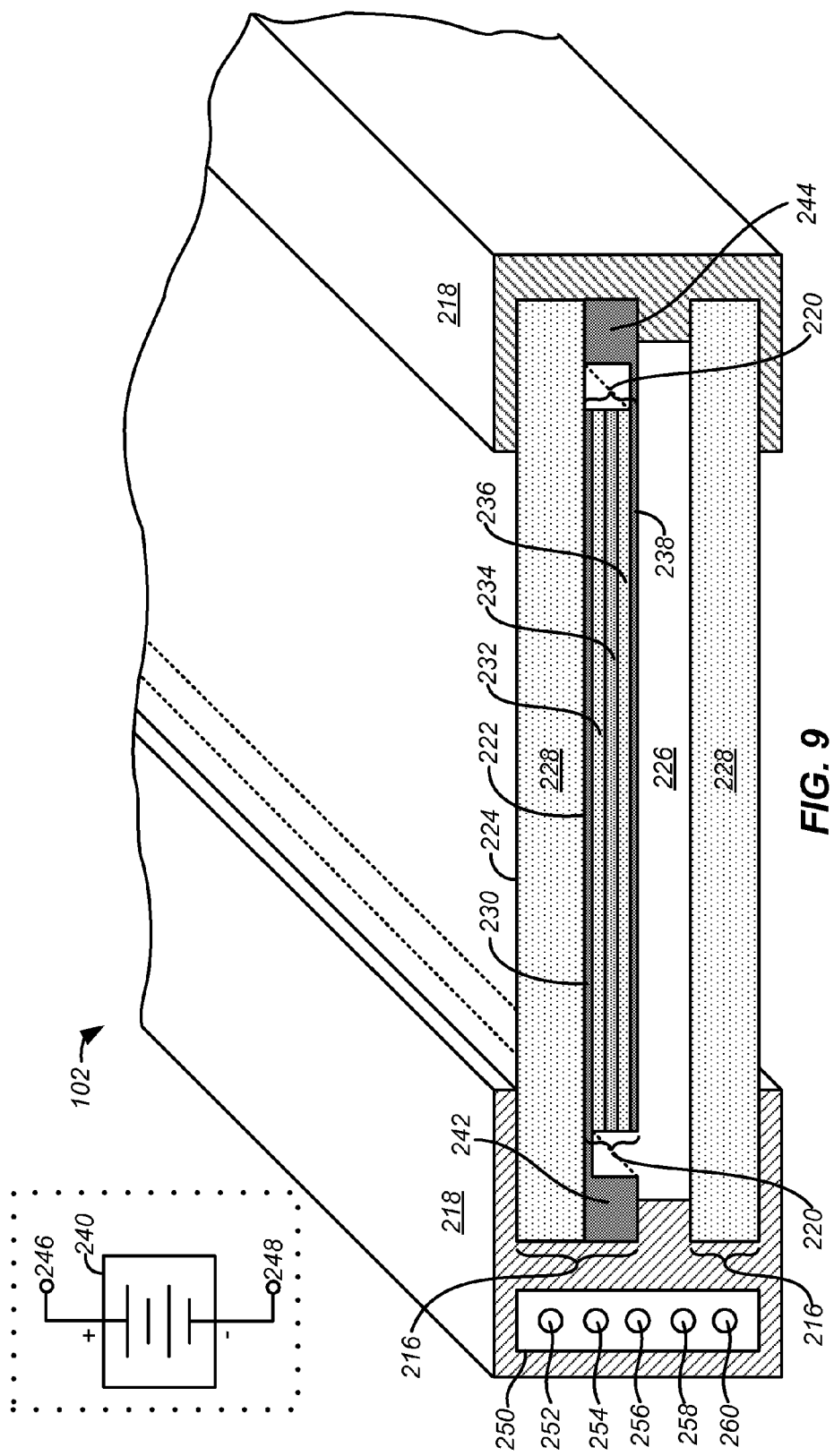
FIG. 9 is a cross-sectional axonometric view of an example electrochromic window that includes two lites.

FIG. 9 shows a cross-sectional axonometric view of an embodiment of an IGU 102 that includes two window panes or lites 216. In various embodiments, IGU 102 can include one, two, or more substantially transparent (e.g., at no applied voltage) lites 216 as well as a frame, 218, that supports the lites 216. For example, the IGU 102 shown in FIG. 9 is configured as a double-pane window. One or more of the lites 216 can itself be a laminate structure of two, three, or more layers or lites (e.g., shatter-resistant glass similar to automotive windshield glass). In IGU 102, at least one of the lites 216 includes an electrochromic device or stack, 220, disposed on at least one of its inner surface, 222, or outer surface, 224: for example, the inner surface 222 of the outer lite 216.

In multi-pane configurations, each adjacent set of lites 216 can have an interior volume, 226, disposed between them. Generally, each of the lites 216 and the IGU 102 as a whole are rectangular and form a rectangular solid. However, in other embodiments other shapes (e.g., circular, elliptical, triangular, curvilinear, convex, concave) may be desired. In some embodiments, the volume 226 between the lites 116 is evacuated of air. In some embodiments, the IGU 102 is hermetically-sealed. Additionally, the volume 226 can be filled (to an appropriate pressure) with one or more gases, such as argon (Ar), krypton (Kr), or xenon (Xn), for example. Filling the volume 226 with a gas such as Ar, Kr, or Xn can reduce conductive heat transfer through the IGU 102 because of the low thermal conductivity of these gases. The latter two gases also can impart improved acoustic insulation due to their increased weight.

In some embodiments, frame 218 is constructed of one or more pieces. For example, frame 218 can be constructed of one or more materials such as vinyl, PVC, aluminum (Al), steel, or fiberglass. The frame 218 may also include or hold one or more foam or other material pieces that work in conjunction with frame 218 to separate the lites 216 and to hermetically seal the volume 226 between the lites 216. For example, in a typical IGU implementation, a spacer lies between adjacent lites 216 and forms a hermetic seal with the panes in conjunction with an adhesive sealant that can be deposited between them. This is termed the primary seal, around which can be fabricated a secondary seal, typically of an additional adhesive sealant. In some such embodiments, frame 218 can be a separate structure that supports the IGU construct.

Each lite 216 includes a substantially transparent or translucent substrate, 228. Generally, substrate 228 has a first (e.g., inner) surface 222 and a second (e.g., outer) surface 224 opposite the first surface 222. In some embodiments, substrate 228 can be a glass substrate. For example, substrate 228 can be a conventional silicon oxide ($SO_x$)-based glass substrate such as soda-lime glass or float glass, composed of, for example, approximately 75% silica ($SiO_2$) plus $Na_2O$, CaO, and several minor additives. However, any material having suitable optical, electrical, thermal, and mechanical properties may be used as substrate 228. Such substrates also can include, for example, other glass materials, plastics and thermoplastics (e.g., poly(methyl methacrylate), polystyrene, polycarbonate, allyl diglycol carbonate, SAN (styrene acrylonitrile copolymer), poly(4-methyl-1-pentene), polyester, polyamide), or mirror materials. If the substrate is formed from, for example, glass, then substrate 228 can be strengthened, e.g., by tempering, heating, or chemically strengthening. In other implementations, the substrate 228 is not further strengthened, e.g., the substrate is untempered.

In some embodiments, substrate 228 is a glass pane sized for residential or commercial window applications. The size of such a glass pane can vary widely depending on the specific needs of the residence or commercial enterprise. In some embodiments, substrate 228 can be formed of architectural glass. Architectural glass is typically used in commercial buildings, but also can be used in residential buildings, and typically, though not necessarily, separates an indoor environment from an outdoor environment. In certain embodiments, a suitable architectural glass substrate can be at least approximately 20 inches by approximately 20 inches, and can be much larger, for example, approximately 80 inches by approximately 120 inches, or larger. Architectural glass is typically at least about 2 millimeters (mm) thick and may be as thick as 6 mm or more. Of course, electrochromic devices 220 can be scalable to substrates 228 smaller or larger than architectural glass, including in any or all of the respective length, width, or thickness dimensions. In some embodiments, substrate 228 has a thickness in the range of approximately 1 mm to approximately 10 mm. In some embodiments, substrate 228 may be very thin and flexible, such as Gorilla Glass® or Willow™ Glass, each commercially available from Corning, Inc. of Corning, N.Y., these glasses may be less than 1 mm thick, as thin as 0.3 mm thick.

Electrochromic device 220 is disposed over, for example, the inner surface 222 of substrate 228 of the outer pane 216 (the pane adjacent the outside environment). In some other embodiments, such as in cooler climates or applications in which the IGUs 102 receive greater amounts of direct sunlight (e.g., perpendicular to the surface of electrochromic device 220), it may be advantageous for electrochromic device 220 to be disposed over, for example, the inner surface (the surface bordering the volume 226) of the inner pane adjacent the interior environment. In some embodiments, electrochromic device 220 includes a first conductive layer (CL) 230 (often transparent), an electrochromic layer (EC) 232, an ion conducting layer (IC) 234, a counter electrode layer (CE) 236, and a second conductive layer (CL) 238 (often transparent). Again, layers 230, 232, 234, 236, and 238 are also collectively referred to as electrochromic stack 220.

A power source 240 operable to apply an electric potential ($V_{app}$) to the device and produce $V_{eff}$ across a thickness of electrochromic stack 220 and drive the transition of the electrochromic device 220 from, for example, a bleached or lighter state (e.g., a transparent, semitransparent, or translucent state) to a colored or darker state (e.g., a tinted, less transparent or less translucent state). In some other embodiments, the order of layers 230, 232, 234, 236, and 238 can be reversed or otherwise reordered or rearranged with respect to substrate 238.

In some embodiments, one or both of first conductive layer 230 and second conductive layer 238 is formed from an inorganic and solid material. For example, first conductive layer 230, as well as second conductive layer 238, can be made from a number of different materials, including conductive oxides, thin metallic coatings, conductive metal nitrides, and composite conductors, among other suitable materials. In some embodiments, conductive layers 230 and 238 are substantially transparent at least in the range of wavelengths where electrochromism is exhibited by the electrochromic layer 232. Transparent conductive oxides include metal oxides and metal oxides doped with one or more metals. For example, metal oxides and doped metal oxides suitable for use as first or second conductive layers 230 and 238 can include indium oxide, indium tin oxide (ITO), doped indium oxide, tin oxide, doped tin oxide, zinc oxide, aluminum zinc oxide, doped zinc oxide, ruthenium oxide, doped ruthenium oxide, among others. As indicated above, first and second conductive layers 230 and 238 are sometimes referred to as "transparent conductive oxide" (TCO) layers.

In some embodiments, commercially available substrates, such as glass substrates, already contain a transparent conductive layer coating when purchased. In some embodiments, such a product can be used for both substrate 238 and conductive layer 230 collectively. Examples of such glass substrates include conductive layer-coated glasses sold under the trademark TEC Glass™ by Pilkington, of Toledo, Ohio and SUNGATET™ 300 and SUNGATET™ 500 by PPG Industries of Pittsburgh, Pa. Specifically, TEC Glass™ is, for example, a glass coated with a fluorinated tin oxide conductive layer.

In some embodiments, first or second conductive layers 230 and 238 can each be deposited by physical vapor deposition processes including, for example, sputtering. In some embodiments, first and second conductive layers 230 and 238 can each have a thickness in the range of approximately 0.01 µm to approximately 1 µm. In some embodiments, it may be generally desirable for the thicknesses of the first and second conductive layers 230 and 238 as well as the thicknesses of any or all of the other layers described below to be individually uniform with respect to the given layer; that is, that the thickness of a given layer is uniform and the surfaces of the layer are smooth and substantially free of defects or other ion traps.

A primary function of the first and second conductive layers 230 and 238 is to spread an electric potential provided by a power source 240, such as a voltage or current source, over surfaces of the electrochromic stack 220 from outer surface regions of the stack to inner surface regions of the stack. As mentioned, the voltage applied to the electrochromic device experiences some Ohmic potential drop from the outer regions to the inner regions as a result of a sheet resistance of the first and second conductive layers 230 and 238. In the depicted embodiment, bus bars 242 and 244 are provided with bus bar 242 in contact with conductive layer 230 and bus bar 244 in contact with conductive layer 238 to provide electric connection between the voltage or current source 240 and the conductive layers 230 and 238. For example, bus bar 242 can be electrically coupled with a first (e.g., positive) terminal 246 of power source 240 while bus bar 244 can be electrically coupled with a second (e.g., negative) terminal 248 of power source 240.

In some embodiments, IGU 102 includes a plug-in component 250. In some embodiments, plug-in component 250 includes a first electrical input 252 (e.g., a pin, socket, or other electrical connector or conductor) that is electrically coupled with power source terminal 246 via, for example, one or more wires or other electrical connections, components, or devices. Similarly, plug-in component 250 can include a second electrical input 254 that is electrically coupled with power source terminal 248 via, for example, one or more wires or other electrical connections, components, or devices. In some embodiments, first electrical input 252 can be electrically coupled with bus bar 242, and from there with first conductive layer 230, while second electrical input 254 can be coupled with bus bar 244, and from there with second conductive layer 238. The conductive layers 230 and 238 also can be connected to power source 240 with other conventional means as well as according to other means described below with respect to a window controller. For example, as described below with reference to FIG. 10, first electrical input 252 can be connected to a first power line while second electrical input 254 can be connected to a second power line. Additionally, in some embodiments, third electrical input 256 can be coupled to a device, system, or building ground. Furthermore, in some embodiments, fourth and fifth electrical inputs/outputs 258 and 260, respectively, can be used for communication between, for example, a window controller or microcontroller and a network controller.

In some embodiments, electrochromic layer 232 is deposited or otherwise formed over first conductive layer 230. In some embodiments, electrochromic layer 232 is formed of an inorganic and solid material. In various embodiments, electrochromic layer 232 can include or be formed of one or more of a number of electrochromic materials, including electrochemically cathodic or electrochemically anodic materials. For example, metal oxides suitable for use as electrochromic layer 232 can include tungsten oxide ($WO_3$), molybdenum oxide ($MoO_3$), niobium oxide ($Nb_2O_5$), titanium oxide ($TiO_2$), copper oxide (CuO), iridium oxide ($Ir_2O_3$), chromium oxide ($Cr_2O_3$), manganese oxide ($Mn_2O_3$), vanadium oxide ($V_2O_5$), nickel oxide ($Ni_2O_3$), and cobalt oxide ($Co_2O_3$), among other materials. In some embodiments, electrochromic layer 232 can have a thickness in the range of approximately 0.05 µm to approximately 1 µm.

During operation, in response to a voltage generated across the thickness of electrochromic layer 232 by first and second conductive layers 230 and 238, electrochromic layer 232 transfers or exchanges ions to or from counter electrode layer 236 resulting in the desired optical transitions in electrochromic layer 232, and in some embodiments, also resulting in an optical transition in counter electrode layer 236. In some embodiments, the choice of appropriate electrochromic and counter electrode materials governs the relevant optical transitions.

In some embodiments, counter electrode layer 236 is formed of an inorganic and solid material. Counter electrode layer 236 can generally include one or more of a number of materials or material layers that can serve as a reservoir of ions when the electrochromic device 220 is in, for example, the transparent state. In some embodiments, counter electrode layer 236 is a second electrochromic layer of opposite polarity as electrochromic layer 232. For example, when electrochromic layer 232 is formed from an electrochemically cathodic material, counter electrode layer 236 can be formed of an electrochemically anodic material. Examples of suitable materials for the counter electrode layer 236 include nickel oxide (NiO), nickel tungsten oxide (NiWO), nickel vanadium oxide, nickel chromium oxide, nickel aluminum oxide, nickel manganese oxide, nickel magnesium oxide, chromium oxide ($Cr_2O_3$), manganese oxide ($MnO_2$), and Prussian blue. In some embodiments, counter electrode layer 236 can have a thickness in the range of approximately 0.05 µm to approximately 1 µm.

During an electrochromic transition initiated by, for example, application of an appropriate electric potential across a thickness of electrochromic stack 220, counter electrode layer 236 transfers all or a portion of the ions it holds to electrochromic layer 232, causing the optical transition in the electrochromic layer 232. In some embodiments, as for example in the case of a counter electrode layer 236 formed from NiWO, the counter electrode layer 236 also optically transitions with the loss of ions it has transferred to the electrochromic layer 232. When charge is removed from a counter electrode layer 236 made of NiWO (e.g., ions are transported from the counter electrode layer 236 to the electrochromic layer 232), the counter electrode layer 236 will transition in the opposite direction (e.g., from a transparent state to a darkened state).

In some embodiments, ion conducting layer 234 serves as a medium through which ions are transported (e.g., in the manner of an electrolyte) when the electrochromic device 220 transitions between optical states. In some embodiments, ion conducting layer 234 is highly conductive to the relevant ions for the electrochromic and the counter electrode layers 232 and 236, but also has sufficiently low electron conductivity such that negligible electron transfer occurs during normal operation. A thin ion conducting layer 234 with high ionic conductivity permits fast ion conduction and hence fast switching for high performance electrochromic devices 220. Electronic leakage current passes through layer 234 during device operation. In some embodiments, ion conducting layer 234 can have a thickness in the range of approximately 0.01 μm to approximately 1 μm.

In some embodiments, ion conducting layer 234 also is inorganic and solid. For example, ion conducting layer 234 can be formed from one or more silicates, silicon oxides, tungsten oxides, tantalum oxides, niobium oxides, and borates. The silicon oxides include silicon-aluminum-oxide. These materials also can be doped with different dopants, including lithium. Lithium-doped silicon oxides include lithium silicon-aluminum-oxide.

In some other embodiments, the electrochromic and the counter electrode layers 232 and 236 are formed immediately adjacent one another, sometimes in direct contact, without separately depositing an ion conducting layer. For example, in some embodiments, electrochromic devices having an interfacial region between first and second conductive electrode layers rather than a distinct ion conducting layer 234 can be utilized. Such devices, and methods of fabricating them, are described in U.S. patent application Ser. Nos. 12/772,055 and 12/772,075, each filed 30 Apr. 2010, and in U.S. patent application Ser. Nos. 12/814,277 and 12/814,279, each filed 11 Jun. 2010, all four of which are titled ELECTROCHROMIC DEVICES and name Zhongchun Wang et al. as inventors. Each of these four applications is incorporated by reference herein in its entirety.

In some embodiments, electrochromic device 220 also can include one or more additional layers (not shown), such as one or more passive layers. For example, passive layers used to improve certain optical properties can be included in or on electrochromic device 220. Passive layers for providing moisture or scratch resistance also can be included in electrochromic device 220. For example, the conductive layers 230 and 238 can be treated with anti-reflective or protective oxide or nitride layers. Other passive layers can serve to hermetically seal the electrochromic device 220.

Additionally, in some embodiments, one or more of the layers in electrochromic stack 220 can contain some amount of organic material. Additionally or alternatively, in some embodiments, one or more of the layers in electrochromic stack 220 can contain some amount of liquids in one or more layers. Additionally or alternatively, in some embodiments, solid state material can be deposited or otherwise formed by processes employing liquid components such as certain processes employing sol-gels or chemical vapor deposition.

Additionally, transitions between a bleached or transparent state and a colored or opaque state are but one example, among many, of an optical or electrochromic transition that can be implemented. Unless otherwise specified herein (including the foregoing discussion), whenever reference is made to a bleached-to-opaque transition (or to and from intermediate states in between), the corresponding device or process described encompasses other optical state transitions such as, for example, intermediate state transitions such as percent transmission (% T) to % T transitions, non-reflective to reflective transitions (or to and from intermediate states in between), bleached to colored transitions (or to and from intermediate states in between), and color to color transitions (or to and from intermediate states in between). Further, the term "bleached" may refer to an optically neutral state, for example, uncolored, transparent or translucent. Still further, unless specified otherwise herein, the "color" of an electrochromic transition is not limited to any particular wavelength or range of wavelengths.

Generally, the colorization or other optical transition of the electrochromic material in electrochromic layer 232 is caused by reversible ion insertion into the material (for example, intercalation) and a corresponding injection of charge-balancing electrons. Typically, some fraction of the ions responsible for the optical transition is irreversibly bound up in the electrochromic material. Some or all of the irreversibly bound ions can be used to compensate "blind charge" in the material. In some embodiments, suitable ions include lithium ions (Li+) and hydrogen ions (H+) (i.e., protons). In some other embodiments, however, other ions can be suitable. Intercalation of lithium ions, for example, into tungsten oxide ($WO_{3-y}$ ($0<y\leq\sim0.3$)) causes the tungsten oxide to change from a transparent (e.g., bleached) state to a blue (e.g., colored) state.

In particular embodiments described herein, the electrochromic device 220 reversibly cycles between a transparent state and an opaque or tinted state. In some embodiments, when the device is in a transparent state, a potential is applied to the electrochromic stack 220 such that available ions in the stack reside primarily in the counter electrode layer 236. When the magnitude of the potential on the electrochromic stack 220 is reduced or its polarity reversed, ions are transported back across the ion conducting layer 234 to the electrochromic layer 232 causing the electrochromic material to transition to an opaque, tinted, or darker state. In certain embodiments, layers 232 and 236 are complementary coloring layers; that is, for example, when ions are transferred into the counter electrode layer it is not colored. Similarly, when or after the ions are transferred out of the electrochromic layer it is also not colored. But when the polarity is switched, or the potential reduced, however, and the ions are transferred from the counter electrode layer into the electrochromic layer, both the counter electrode and the electrochromic layers become colored.

In some other embodiments, when the device is in an opaque state, a potential is applied to the electrochromic stack 220 such that available ions in the stack reside primarily in the counter electrode layer 236. In such embodiments, when the magnitude of the potential on the electrochromic stack 220 is reduced or its polarity reversed, ions are transported back across the ion conducting layer 234 to the electrochromic layer 232 causing the electrochromic material to transition to a transparent or lighter state. These layers may also be complementary coloring.

Figure 10:
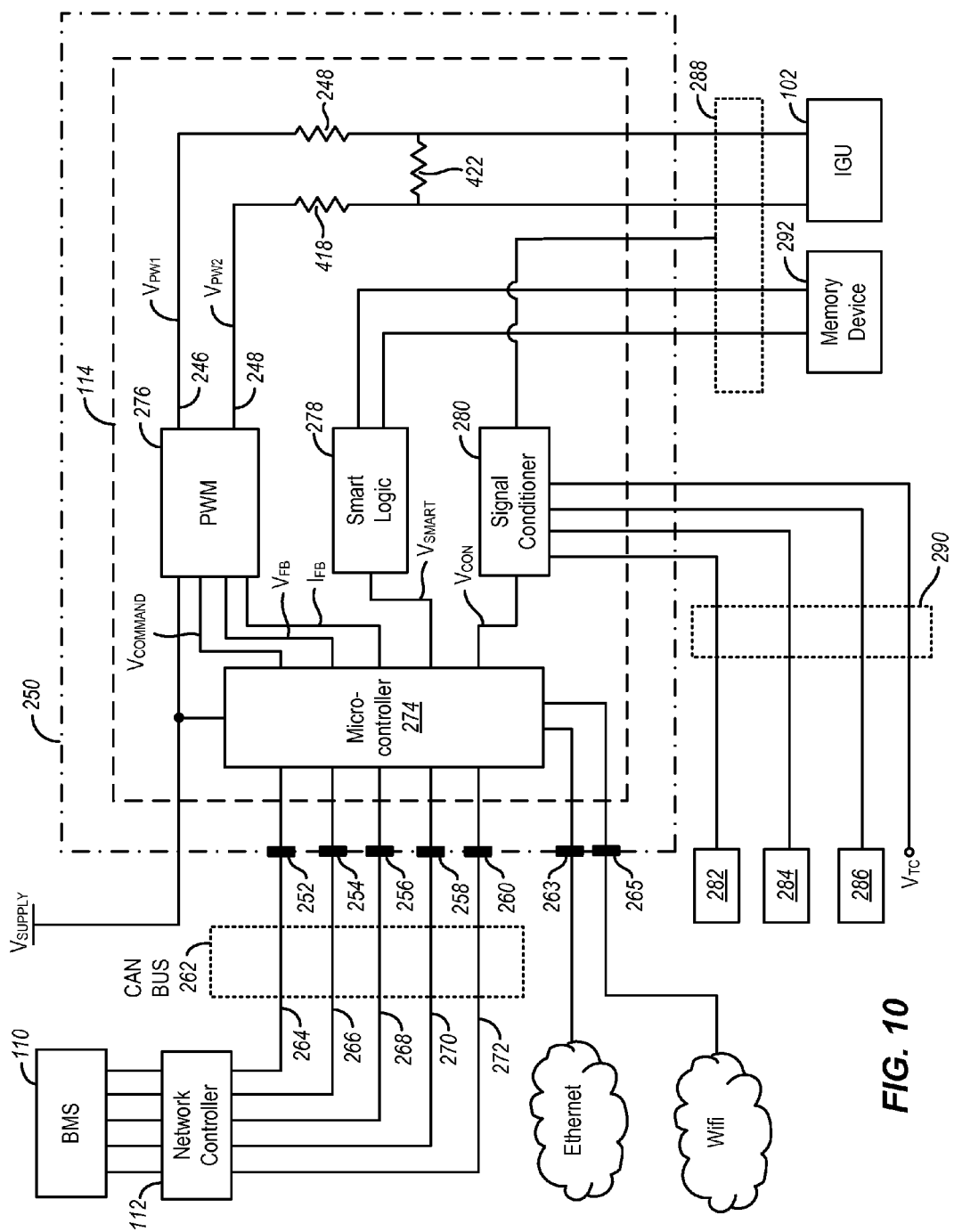
FIG. 10 is a schematic representation of a window controller and associated components.

The optical transition driving logic can be implemented in many different controller configurations and coupled with other control logic. Various examples of suitable controller design and operation are provided in the following patent applications, each incorporated herein by reference in its entirety: U.S. patent application Ser. No. 13/049,623, filed Mar. 16, 2011; U.S. patent application Ser. No. 13/049,756, filed Mar. 16, 2011; U.S. Pat. No. 8,213,074, filed Mar. 16, 2011; U.S. patent application Ser. No. 13/449,235, filed Apr. 17, 2012; U.S. patent application Ser. No. 13/449,248, filed Apr. 17, 2012; U.S. patent application Ser. No. 13/449,251, filed Apr. 17, 2012; and U.S. patent application Ser. No. 13/326,168, filed Dec. 14, 2011. The following description and associated figures, FIGS. 9 and 10, present certain non-limiting controller design options suitable for implementing the drive profiles described herein.

In some embodiments, electrical input 252 and electrical input 254 receive, carry, or transmit complementary power signals. In some embodiments, electrical input 252 and its complement electrical input 254 can be directly connected to the bus bars 242 and 244, respectively, and on the other side, to an external power source that provides a variable DC voltage (e.g., sign and magnitude). The external power source can be a window controller (see element 114 of FIG. 10) itself, or power from a building transmitted to a window controller or otherwise coupled to electrical inputs 252 and 254. In such an embodiment, the electrical signals transmitted through electrical inputs/outputs 258 and 260 can be directly connected to a memory device to allow communication between the window controller and the memory device. Furthermore, in such an embodiment, the electrical signal input to electrical input 256 can be internally connected or coupled (within IGU 102) to either electrical input 252 or 254 or to the bus bars 242 or 244 in such a way as to enable the electrical potential of one or more of those elements to be remotely measured (sensed). This can allow the window controller to compensate for a voltage drop on the connecting wires from the window controller to the electrochromic device 220.

In some embodiments, the window controller can be immediately attached (e.g., external to the IGU 102 but inseparable by the user) or integrated within the IGU 102. For example, U.S. patent application Ser. No. 13/049,750 naming Brown et al. as inventors, titled ONBOARD CONTROLLER FOR MULTISTATE WINDOWS and filed 16 Mar. 2011, incorporated by reference herein, describes in detail various embodiments of an "onboard" controller. In such an embodiment, electrical input 252 can be connected to the positive output of an external DC power source. Similarly, electrical input 254 can be connected to the negative output of the DC power source. As described below, however, electrical inputs 252 and 254 can, alternately, be connected to the outputs of an external low voltage AC power source (e.g., a typical 24 V AC transformer common to the HVAC industry). In such an embodiment, electrical inputs/outputs 258 and 260 can be connected to the communication bus between the window controller and a network controller. In this embodiment, electrical input/output 256 can be eventually (e.g., at the power source) connected with the earth ground (e.g., Protective Earth, or PE in Europe) terminal of the system.

Although the voltages plotted in FIGS. 7 and 8 may be expressed as DC voltages, in some embodiments, the voltages actually supplied by the external power source are AC voltage signals. In some other embodiments, the supplied voltage signals are converted to pulse-width modulated voltage signals. However, the voltages actually "seen" or applied to the bus bars 242 and 244 are effectively DC voltages. Typically, the voltage oscillations applied at terminals 246 and 248 are in the range of approximately 1 Hz to 1 MHz, and in particular embodiments, approximately 100 kHz. In various embodiments, the oscillations have asymmetric residence times for the darkening (e.g., tinting) and lightening (e.g., bleaching) portions of a period. For example, in some embodiments, transitioning from a first less transparent state to a second more transparent state requires more time than the reverse; that is, transitioning from the more transparent second state to the less transparent first state. As will be described below, a controller can be designed or configured to apply a driving voltage meeting these requirements.

The oscillatory applied voltage control allows the electrochromic device 220 to operate in, and transition to and from, one or more states without any necessary modification to the electrochromic device stack 220 or to the transitioning time. Rather, the window controller can be configured or designed to provide an oscillating drive voltage of appropriate wave profile, taking into account such factors as frequency, duty cycle, mean voltage, amplitude, among other possible suitable or appropriate factors. Additionally, such a level of control permits the transitioning to any state over the full range of optical states between the two end states. For example, an appropriately configured controller can provide a continuous range of transmissivity (% T) which can be tuned to any value between end states (e.g., opaque and bleached end states).

To drive the device to an intermediate state using the oscillatory driving voltage, a controller could simply apply the appropriate intermediate voltage. However, there can be more efficient ways to reach the intermediate optical state. This is partly because high driving voltages can be applied to reach the end states but are traditionally not applied to reach an intermediate state. One technique for increasing the rate at which the electrochromic device 220 reaches a desired intermediate state is to first apply a high voltage pulse suitable for full transition (to an end state) and then back off to the voltage of the oscillating intermediate state (just described). Stated another way, an initial low frequency single pulse (low in comparison to the frequency employed to maintain the intermediate state) of magnitude and duration chosen for the intended final state can be employed to speed the transition. After this initial pulse, a higher frequency voltage oscillation can be employed to sustain the intermediate state for as long as desired.

In some embodiments, each IGU 102 includes a component 250 that is "pluggable" or readily-removable from IGU 102 (e.g., for ease of maintenance, manufacture, or replacement). In some particular embodiments, each plug-in component 250 itself includes a window controller. That is, in some such embodiments, each electrochromic device 220 is controlled by its own respective local window controller located within plug-in component 250. In some other embodiments, the window controller is integrated with another portion of frame 218, between the glass panes in the secondary seal area, or within volume 226. In some other embodiments, the window controller can be located external to IGU 102. In various embodiments, each window controller can communicate with the IGUs 102 it controls and drives, as well as communicate to other window controllers, the network controller, BMS, or other servers, systems, or devices (e.g., sensors), via one or more wired (e.g., Ethernet) networks or wireless (e.g., WiFi) networks, for example, via wired (e.g., Ethernet) interface 263 or wireless (WiFi) interface 265. See FIG. 10. Embodiments having Ethernet or Wifi capabilities are also well-suited for use in residential homes and other smaller-scale non-commercial applications. Additionally, the communication can be direct or indirect, e.g., via an intermediate node between a master controller such as network controller 112 and the IGU 102.

FIG. 10 depicts a window controller 114, which may be deployed as, for example, component 250. In some embodiments, window controller 114 communicates with a network controller over a communication bus 262. For example, communication bus 262 can be designed according to the Controller Area Network (CAN) vehicle bus standard. In such embodiments, first electrical input 252 can be connected to a first power line 264 while second electrical input 254 can be connected to a second power line 266. In some embodiments, as described above, the power signals sent over power lines 264 and 266 are complementary; that is, collectively they represent a differential signal (e.g., a differential voltage signal). In some embodiments, line 268 is coupled to a system or building ground (e.g., an Earth Ground). In such embodiments, communication over CAN bus 262 (e.g., between microcontroller 274 and network controller 112) may proceed along first and second communication lines 270 and 272 transmitted through electrical inputs/outputs 258 and 260, respectively, according to the CANopen communication protocol or other suitable open, proprietary, or overlying communication protocol. In some embodiments, the communication signals sent over communication lines 270 and 272 are complementary; that is, collectively they represent a differential signal (e.g., a differential voltage signal).

In some embodiments, component 250 couples CAN communication bus 262 into window controller 114, and in particular embodiments, into microcontroller 274. In some such embodiments, microcontroller 274 is also configured to implement the CANopen communication protocol. Microcontroller 274 is also designed or configured (e.g., programmed) to implement one or more drive control algorithms in conjunction with pulse-width modulated amplifier or pulse-width modulator (PWM) 276, smart logic 278, and signal conditioner 280. In some embodiments, microcontroller 274 is configured to generate a command signal $V_{COMMAND}$, e.g., in the form of a voltage signal, that is then transmitted to PWM 276. PWM 276, in turn, generates a pulse-width modulated power signal, including first (e.g., positive) component $V_{PW1}$ and second (e.g., negative) component $V_{PW2}$, based on $V_{COMMAND}$. Power signals $V_{PW1}$ and $V_{PW2}$ are then transmitted over, for example, interface 288, to IGU 102, or more particularly, to bus bars 242 and 244 in order to cause the desired optical transitions in electrochromic device 220. In some embodiments, PWM 276 is configured to modify the duty cycle of the pulse-width modulated signals such that the durations of the pulses in signals $V_{PW1}$ and $V_{PW2}$ are not equal: for example, PWM 276 pulses $V_{PW1}$ with a first 60% duty cycle and pulses $V_{PW2}$ for a second 40% duty cycle. The duration of the first duty cycle and the duration of the second duty cycle collectively represent the duration, $t_{PWM}$ of each power cycle. In some embodiments, PWM 276 can additionally or alternatively modify the magnitudes of the signal pulses $V_{PW1}$ and $V_{PW2}$.

In some embodiments, microcontroller 274 is configured to generate $V_{COMMAND}$ based on one or more factors or signals such as, for example, any of the signals received over CAN bus 262 as well as voltage or current feedback signals, $V_{FB}$ and $I_{FB}$ respectively, generated by PWM 276. In some embodiments, microcontroller 274 determines current or voltage levels in the electrochromic device 220 based on feedback signals $I_{FB}$ or $V_{FB}$, respectively, and adjusts $V_{COMMAND}$ according to one or more rules or algorithms to effect a change in the relative pulse durations (e.g., the relative durations of the first and second duty cycles) or amplitudes of power signals $V_{PW1}$ and $V_{PW2}$ to produce voltage profiles as described above. Additionally or alternatively, microcontroller 274 can also adjust $V_{COMMAND}$ in response to signals received from smart logic 278 or signal conditioner 280. For example, a conditioning signal $V_{CON}$ can be generated by signal conditioner 280 in response to feedback from one or more networked or non-networked devices or sensors, such as, for example, an exterior photosensor or photodetector 282, an interior photosensor or photodetector 284, a thermal or temperature sensor 286, or a tint command signal $V_{TC}$. For example, additional embodiments of signal conditioner 280 and $V_{CON}$ are also described in U.S. patent application Ser. No. 13/449,235, filed 17 Apr. 2012, and previously incorporated by reference.

In certain embodiments, $V_{TC}$ can be an analog voltage signal between 0 V and 10 V that can be used or adjusted by users (such as residents or workers) to dynamically adjust the tint of an IGU 102 (for example, a user can use a control in a room or zone of building 104 similarly to a thermostat to finely adjust or modify a tint of the IGUs 102 in the room or zone) thereby introducing a dynamic user input into the logic within microcontroller 274 that determines $V_{COMMAND}$. For example, when set in the 0 to 2.5 V range, $V_{TC}$ can be used to cause a transition to a 5% T state, while when set in the 2.51 to 5 V range, $V_{TC}$ can be used to cause a transition to a 20% T state, and similarly for other ranges such as 5.1 to 7.5 V and 7.51 to 10 V, among other range and voltage examples. In some embodiments, signal conditioner 280 receives the aforementioned signals or other signals over a communication bus or interface 290. In some embodiments, PWM 276 also generates $V_{COMMAND}$ based on a signal $V_{SMART}$ received from smart logic 278. In some embodiments, smart logic 278 transmits $V_{SMART}$ over a communication bus such as, for example, an Inter-Integrated Circuit (I²C) multi-master serial single-ended computer bus. In some other embodiments, smart logic 278 communicates with memory device 292 over a 1-WIRE device communications bus system protocol (by Dallas Semiconductor Corp., of Dallas, Tex.).

In some embodiments, microcontroller 274 includes a processor, chip, card, or board, or a combination of these, which includes logic for performing one or more control functions. Power and communication functions of microcontroller 274 may be combined in a single chip, for example, a programmable logic device (PLD) chip or field programmable gate array (FPGA), or similar logic. Such integrated circuits can combine logic, control and power functions in a single programmable chip. In one embodiment, where one pane 216 has two electrochromic devices 220 (e.g., on opposite surfaces) or where IGU 102 includes two or more panes 216 that each include an electrochromic device 220, the logic can be configured to control each of the two electrochromic devices 220 independently from the other. However, in one embodiment, the function of each of the two electrochromic devices 220 is controlled in a synergistic fashion, for example, such that each device is controlled in order to complement the other. For example, the desired level of light transmission, thermal insulative effect, or other property can be controlled via a combination of states for each of the individual electrochromic devices 220. For example, one electrochromic device may be placed in a colored state while the other is used for resistive heating, for example, via a transparent electrode of the device. In another example, the optical states of the two electrochromic devices are controlled so that the combined transmissivity is a desired outcome.

In general, the logic used to control electrochromic device transitions can be designed or configured in hardware and/or software. In other words, the instructions for controlling the drive circuitry may be hard coded or provided as software. In may be said that the instructions are provided by "programming". Such programming is understood to include logic of any form including hard coded logic in digital signal processors and other devices which have specific algorithms implemented as hardware. Programming is also understood to include software or firmware instructions that may be executed on a general purpose processor. In some embodiments, instructions for controlling application of voltage to the bus bars are stored on a memory device associated with the controller or are provided over a network. Examples of suitable memory devices include semiconductor memory, magnetic memory, optical memory, and the like. The computer program code for controlling the applied voltage can be written in any conventional computer readable programming language such as assembly language, C, C++, Pascal, Fortran, and the like. Compiled object code or script is executed by the processor to perform the tasks identified in the program.

As described above, in some embodiments, microcontroller 274, or window controller 114 generally, also can have wireless capabilities, such as wireless control and powering capabilities. For example, wireless control signals, such as radio-frequency (RF) signals or infra-red (IR) signals can be used, as well as wireless communication protocols such as WiFi (mentioned above), Bluetooth, Zigbee, EnOcean, among others, to send instructions to the microcontroller 274 and for microcontroller 274 to send data out to, for example, other window controllers, a network controller 112, or directly to a BMS 110. In various embodiments, wireless communication can be used for at least one of programming or operating the electrochromic device 220, collecting data or receiving input from the electrochromic device 220 or the IGU 102 generally, collecting data or receiving input from sensors, as well as using the window controller 114 as a relay point for other wireless communications. Data collected from IGU 102 also can include count data, such as a number of times an electrochromic device 220 has been activated (cycled), an efficiency of the electrochromic device 220 over time, among other useful data or performance metrics.

The window controller 114 also can have wireless power capability. For example, window controller can have one or more wireless power receivers that receive transmissions from one or more wireless power transmitters as well as one or more wireless power transmitters that transmit power transmissions enabling window controller 114 to receive power wirelessly and to distribute power wirelessly to electrochromic device 220. Wireless power transmission includes, for example, induction, resonance induction, RF power transfer, microwave power transfer, and laser power transfer. For example, U.S. patent application Ser. No. 12/971,576 naming Rozbicki as inventor, titled WIRELESS POWERED ELECTROCHROMIC WINDOWS and filed 17 Dec. 2010, incorporated by reference herein, describes in detail various embodiments of wireless power capabilities.

In order to achieve a desired optical transition, the pulse-width modulated power signal is generated such that the positive component $V_{PW1}$ is supplied to, for example, bus bar 244 during the first portion of the power cycle, while the negative component $V_{PW2}$ is supplied to, for example, bus bar 242 during the second portion of the power cycle.

In some cases, depending on the frequency (or inversely the duration) of the pulse-width modulated signals, this can result in bus bar 244 floating at substantially the fraction of the magnitude of $V_{PW1}$ that is given by the ratio of the duration of the first duty cycle to the total duration $t_{PWM}$ of the power cycle. Similarly, this can result in bus bar 242 floating at substantially the fraction of the magnitude of $V_{PW2}$ that is given by the ratio of the duration of the second duty cycle to the total duration $t_{PWM}$ of the power cycle. In this way, in some embodiments, the difference between the magnitudes of the pulse-width modulated signal components $V_{PW1}$ and $V_{PW2}$ is twice the effective DC voltage across terminals 246 and 248, and consequently, across electrochromic device 220. Said another way, in some embodiments, the difference between the fraction (determined by the relative duration of the first duty cycle) of $V_{PW1}$ applied to bus bar 244 and the fraction (determined by the relative duration of the second duty cycle) of $V_{PW2}$ applied to bus bar 242 is the effective DC voltage $V_{EFF}$ applied to electrochromic device 220. The current IEFF through the load—electromagnetic device 220—is roughly equal to the effective voltage VEFF divided by the effective resistance (represented by resistor 316) or impedance of the load.

Other Embodiments

Although the foregoing embodiments have been described in some detail to facilitate understanding, the described embodiments are to be considered illustrative and not limiting. It will be apparent to one of ordinary skill in the art that certain changes and modifications can be practiced within the scope of the appended claims. For example, while the drive profiles have been described with reference to electrochromic devices having planar bus bars, they apply to any bus bar orientation in which bus bars of opposite polarity are separated by distances great enough to cause a significant ohmic voltage drop in a transparent conductor layer from one bus bar to another. Further, while the drive profiles have been described with reference to electrochromic devices, they can be applied to other devices in which bus bars of opposite polarity are disposed at opposite sides of the devices.

The invention claimed is:

1. A controller for controlling the optical state of a thin film electrochromic device, the controller comprising:
   circuitry for applying voltage or providing instructions to apply voltage between bus bars on the thin film electrochromic device;
   a processing component designed or configured to perform the following operations:
   (i) determine that the thin film electrochromic device should transition from a first optical state to a second optical state; and
   (ii) hold a first applied voltage between the bus bars of the thin film electrochromic device in response to determining that the thin film electrochromic device should transition from the first optical state to the second optical state,
   wherein the first applied voltage has a magnitude sufficient to ensure that at all locations on the thin film electrochromic device experience an effective voltage between a maximum effective voltage identified as safely avoiding damage to the thin film electrochromic device and a minimum effective voltage identified as sufficient to drive the transition from the first optical state to the second optical state, and
   wherein the first applied voltage is significantly greater than the maximum effective voltage.

2. The controller of claim 1, wherein the processing component is designed or configured to maintain an effective voltage at all locations on the thin film electrochromic device during the transition from the first optical state to the second optical state.

3. The controller of claim 2, wherein the processing component is designed or configured to lower the magnitude of the first applied voltage between the bus bars from the first voltage during the course of the transition from the first optical state to the second optical state.

4. The controller of claim 1, wherein the maximum effective voltage is about 2.5 volts or lower and the minimum effective voltage is about 1.2 volts or higher.

5. An electrochromic device and control system comprising:
   the controller of claim 1; and a thin film electrochromic device having bus bars electrically coupled to the controller.

6. The electrochromic device and control system of claim 5, wherein the bus bars are disposed at opposite sides of the thin film electrochromic device.

7. The electrochromic device and control system of claim 5, wherein the thin film electrochromic device is disposed on architectural glass.

8. The electrochromic device and control system of claim 5, wherein the thin film electrochromic device has its bus bars separated by a distance of at least about 30 inches.

9. The electrochromic device and control system of claim 5, wherein the thin film electrochromic device has its bus bars separated by a distance of at least about 40 inches.

10. The electrochromic device and control system of claim 5, wherein the thin film electrochromic device has a width of at least about 30 inches.

11. The electrochromic device and control system of claim 5, wherein the thin film electrochromic device has two transparent conductive layers, each with a sheet resistance $R_s$, and wherein the bus bars are separated by a distance L, and wherein the thin film electrochromic device has a value of $R_s * J * L^2$ of greater than about 3V.

12. A controller for controlling the optical state of a thin film electrochromic device, the controller comprising:
   circuitry for applying voltage or providing instructions to apply voltage between bus bars on the thin film electrochromic device;
   a non-transitory medium storing instructions for controlling the circuitry, the instructions comprising
     (i) code for determining that the thin film electrochromic device should transition from a first optical state to a second optical state; and
     (ii) code for holding a first applied voltage between the bus bars of the thin film electrochromic device in response to determining that the thin film electrochromic device should transition from the first optical state to the second optical state,
   wherein the first applied voltage is chosen to ensure that at all locations on the thin film electrochromic device experience an effective voltage between a maximum effective voltage identified as safely avoiding damage to the thin film electrochromic device and a minimum effective voltage identified as sufficient to drive the transition from the first optical state to the second optical state, and
   wherein the first applied voltage is significantly greater than the maximum effective voltage.

13. The controller of claim 12, wherein the medium storing instructions further comprises code for maintaining an effective voltage at all locations on the thin film electrochromic device during the transition from the first optical state to the second optical state.

14. The controller of claim 13, wherein the medium storing instructions further comprises code for lowering the magnitude of the first applied voltage between the bus bars from the first voltage during the course of the transition from the first optical state to the second optical state.

15. The controller of claim 12, wherein the maximum effective voltage is about 2.5 volts or lower and the minimum effective voltage is about 1.2 volts or higher.

16. The controller of claim 12, wherein the medium storing instructions further comprises code for ramping the applied voltage to the bus bars at a defined ramp rate until reaching the first applied voltage.

17. The controller of claim 12, wherein the first applied voltage is between about 2.5 and 5 volts.

18. The controller of claim 12, wherein the medium storing instructions further comprises code for holding the first applied voltage to the bus bars for a defined period.

19. The controller of claim 12, wherein the medium storing instructions further comprises code for ramping the applied voltage to the bus bars from the first applied voltage to a hold voltage having a smaller magnitude than the first applied voltage.

20. The controller of claim 19, wherein the code for ramping the applied voltage to the bus bars from the first applied voltage to a hold voltage specifies a defined ramp rate.

21. The electrochromic device of claim 9, wherein the thin film electrochromic device has its bus bars separated by a distance of at least about 50 inches.

22. The electrochromic device of claim 9, wherein the thin film electrochromic device has its bus bars separated by a distance of at least about 60 inches.

23. An electrochromic device and control system comprising:
   the controller of claim 12; and
   a thin film electrochromic device having bus bars electrically coupled to the controller.

24. The electrochromic device of claim 23, wherein the thin film electrochromic device has its bus bars separated by a distance of at least about 40 inches.

25. The electrochromic device of claim 23, wherein the thin film electrochromic device has its bus bars separated by a distance of at least about 60 inches.

* * * * *